(12) United States Patent
Volkerink et al.

(10) Patent No.: US 12,405,151 B2
(45) Date of Patent: Sep. 2, 2025

(54) INVISIBLE INDUSTRIAL INTERNET-OF-THINGS

(71) Applicant: Trackonomy Systems, Inc., San Jose, CA (US)

(72) Inventors: Hendrik J. Volkerink, Palo Alto, CA (US); Ajay Khoche, West San Jose, CA (US)

(*) Notice: Subject to any disclaimer, the term of this patent is extended or adjusted under 35 U.S.C. 154(b) by 522 days.

(21) Appl. No.: 17/367,815

(22) Filed: Jul. 6, 2021

(65) Prior Publication Data

US 2022/0003588 A1 Jan. 6, 2022

Related U.S. Application Data

(60) Provisional application No. 63/047,966, filed on Jul. 3, 2020.

(51) Int. Cl.
| | | |
|---|---|---|
| *G01F 23/80* | (2022.01) | |
| *H04L 67/12* | (2022.01) | |
| *H04Q 9/00* | (2006.01) | |
| *G08B 21/18* | (2006.01) | |

(52) U.S. Cl.
CPC ............ *G01F 23/804* (2022.01); *H04L 67/12* (2013.01); *H04Q 9/00* (2013.01); *G08B 21/182* (2013.01); *H04Q 2209/40* (2013.01)

(58) Field of Classification Search
CPC .. G01F 23/804; G01F 15/063; G01F 23/2962; H04L 67/12; H04Q 9/00; H04Q 2209/40; G08B 21/182
See application file for complete search history.

(56) References Cited

U.S. PATENT DOCUMENTS

| | | |
|---|---|---|
| 6,265,977 B1 | 7/2001 | Vega et al. |
| 6,972,682 B2 | 12/2005 | Lareau et al. |
| 7,797,367 B1 | 9/2010 | Gelvin |
| 9,015,652 B2 | 4/2015 | Suenbuel et al. |

(Continued)

FOREIGN PATENT DOCUMENTS

| | | |
|---|---|---|
| WO | 2010035150 A1 | 4/2010 |
| WO | 2013013200 A1 | 1/2013 |

(Continued)

OTHER PUBLICATIONS

U.S. Appl. No. 17/671,568 Non-Final Office Action Dated Aug. 10, 2023, 14 pages.

(Continued)

*Primary Examiner* — Eyob Hagos

(57) ABSTRACT

A method may include a first intelligent node collecting sensor data of fluid within a confined space within proximity of the intelligent node. The method may further include the first intelligent node analyzing the sensor data to determine a level of fluid within the confined space. The method may further include the first intelligent node comparing the level of fluid within the confined space to a predetermined level of fluid. The method may further include determining, based on comparing the level of fluid within the confined space to the predetermined level of fluid, that a fluid threshold is satisfied. The method may further include first intelligent node transmitting the sensor data to a wireless network in response to determining that the fluid threshold is satisfied.

23 Claims, 9 Drawing Sheets

(56) References Cited

U.S. PATENT DOCUMENTS

| | | | |
|---|---|---|---|
| 9,565,622 | B2 | 2/2017 | Chikkappa et al. |
| 9,740,976 | B2 | 8/2017 | Ozaki et al. |
| 9,773,220 | B2 | 9/2017 | Blanchard et al. |
| 9,794,753 | B1 | 10/2017 | Stitt |
| 10,313,925 | B2 | 6/2019 | Jones et al. |
| 10,379,842 | B2 | 8/2019 | Malladi et al. |
| 10,810,858 | B2* | 10/2020 | Israelsen .............. G08B 21/182 |
| 2005/0063313 | A1 | 3/2005 | Nanavati et al. |
| 2008/0018492 | A1 | 1/2008 | Ehrke et al. |
| 2008/0040481 | A1 | 2/2008 | Joshi |
| 2008/0151801 | A1 | 6/2008 | Mizuta |
| 2008/0190953 | A1* | 8/2008 | Mallett ................... B07C 7/005 221/13 |
| 2009/0290511 | A1 | 11/2009 | Budampati et al. |
| 2010/0063673 | A1 | 3/2010 | Anderson |
| 2011/0035491 | A1 | 2/2011 | Gelvin et al. |
| 2011/0111726 | A1 | 5/2011 | Kholaif |
| 2011/0202554 | A1 | 8/2011 | Powilleit et al. |
| 2012/0054527 | A1 | 3/2012 | Pfeifer et al. |
| 2014/0006131 | A1 | 1/2014 | Causey et al. |
| 2014/0347194 | A1* | 11/2014 | Schnitz ................... G01F 23/22 340/870.01 |
| 2015/0154531 | A1 | 6/2015 | Skaaksrud |
| 2015/0180971 | A1 | 6/2015 | Varney et al. |
| 2015/0249482 | A1 | 9/2015 | Czaja |
| 2016/0055454 | A1 | 2/2016 | Kazanchian |
| 2016/0057695 | A1 | 2/2016 | Tomida |
| 2016/0088424 | A1 | 3/2016 | Polo |
| 2016/0104099 | A1 | 4/2016 | Villamar |
| 2016/0128043 | A1 | 5/2016 | Shuman et al. |
| 2016/0239791 | A1 | 8/2016 | Burch, V et al. |
| 2016/0260059 | A1 | 9/2016 | Benjamin et al. |
| 2016/0343124 | A1* | 11/2016 | Sundheimer ............ G01F 22/00 |
| 2017/0006135 | A1 | 1/2017 | Siebel et al. |
| 2017/0026488 | A1 | 1/2017 | Hao et al. |
| 2017/0078769 | A1* | 3/2017 | Theberge .............. G01F 23/292 |
| 2017/0155703 | A1 | 6/2017 | Hao et al. |
| 2017/0169688 | A1 | 6/2017 | Britt et al. |
| 2017/0238035 | A1 | 8/2017 | Perez |
| 2017/0280351 | A1 | 9/2017 | Skaaksrud |
| 2018/0026799 | A1* | 1/2018 | Pottier ...................... H04L 9/30 713/156 |
| 2018/0031256 | A1 | 2/2018 | Gillette et al. |
| 2018/0041856 | A1 | 2/2018 | Lou et al. |
| 2018/0084371 | A1 | 3/2018 | Scagnol et al. |
| 2018/0086306 | A1 | 3/2018 | Schmotzer et al. |
| 2018/0137457 | A1 | 5/2018 | Sachs et al. |
| 2018/0139726 | A1 | 5/2018 | Choi et al. |
| 2018/0163095 | A1 | 6/2018 | Khoche |
| 2018/0165568 | A1 | 6/2018 | Khoche |
| 2018/0183874 | A1 | 6/2018 | Cook |
| 2018/0262571 | A1 | 9/2018 | Akhtar |
| 2018/0267547 | A1 | 9/2018 | Michalakis |
| 2018/0276650 | A1 | 9/2018 | Hillier |
| 2018/0279179 | A1 | 9/2018 | Norlen et al. |
| 2018/0288013 | A1 | 10/2018 | Hennebert et al. |
| 2018/0293513 | A1 | 10/2018 | Sugaya |
| 2018/0365635 | A1 | 12/2018 | Lucrecio et al. |
| 2018/0374127 | A1 | 12/2018 | Walden |
| 2019/0014043 | A1 | 1/2019 | Hui |
| 2019/0075518 | A1 | 3/2019 | Ganton |
| 2019/0098578 | A1 | 3/2019 | Baroudi |
| 2019/0116091 | A1 | 4/2019 | Bijavara Aswathanarayana Rao et al. |
| 2019/0138534 | A1 | 5/2019 | Bernat et al. |
| 2019/0158606 | A1 | 5/2019 | Guim Bernat et al. |
| 2019/0222055 | A1* | 7/2019 | Khoche .............. G06K 19/0704 |
| 2019/0370624 | A1 | 12/2019 | Khoche |
| 2020/0363822 | A1* | 11/2020 | Georgeson .......... G01M 5/0016 |

FOREIGN PATENT DOCUMENTS

| | | | |
|---|---|---|---|
| WO | WO-2016137195 A1 * | 9/2016 | ............. A62C 13/76 |
| WO | 2017196190 A1 | 11/2017 | |

OTHER PUBLICATIONS

U.S. Appl. No. 17/671,568 Final Office Action Dated Apr. 20, 2023, 15 pages.

U.S. Appl. No. 17/671,568 Non-Final Office Action Dated Nov. 17, 2022, 11 pages.

Behera, Analysis of Fire Extinguisher Gauge Level Using Open CV, International Journal of Advanced Engineering Research and Science, Aug. 2017, retrieved on [Oct. 29, 2021]. Retrieved from the internet <URL:https://ijaers.com/uploads/issue_files/5%201JAERS-AUG-2017-5-Analysis%20of%20fire%20extinguisher%20gauge.pdf> entire document.

PCT Application No. PCT/US2021/040532, International Search Report and Written Opinion, dated Dec. 2, 2021, 16 pages.

U.S. Appl. No. 17/019,694, Notice of Allowance, dated Nov. 17, 2021, 9 pages.

U.S. Appl. No. 16/822,932, Non-Final Office Action dated Jul. 30, 2021, 30 pages.

PCT Application No. PCT/US2020/023007, International Search Report and Written Opinion, dated Jun. 15, 2020, 9 pages.

Viswanadham et al., "Lead Time Models for Analysis of Supply Chain Networks", 10 pages.

U.S. Appl. No. 17/019,694, Notice of Allowance issued Jul. 30, 2021, 8 pages.

Luo et al., "Self-Securing Ad Hoc Wireless Networks." Proceedings of the Seventh International Symposium on Computers and Communications (ISCC'02). 1530-1346/02,2002, IEEE Computer Society.

Pagani etal., "Resource Sharing Between Neighboring Nodes in Heterogeneous Wireless Sensor Networks." 2015 European Conference on Networks and Communications (EuCNC). Conference dated Jun. 29 to Jul. 2, 2015.

Lucrecio et al., "Systems and Methods for Hybrid Cloud-Edge Computing Method for Automated Decision Making and Probabilistic Occurrence." U.S. Appl. No. 62/520,348, filed Jun. 15, 2017. Expired.

PCT Application No. PCT/US20/050728, International Search Reported dated Dec. 16, 2020, pp. 1-2.

U.S. Appl. No. 16/822,932 Final Office Action dated Jun. 24, 2022, 7 pages.

U.S. Appl. No. 16/822,932 Non-Final Office Action dated Mar. 10, 2022, 10 pages.

\* cited by examiner

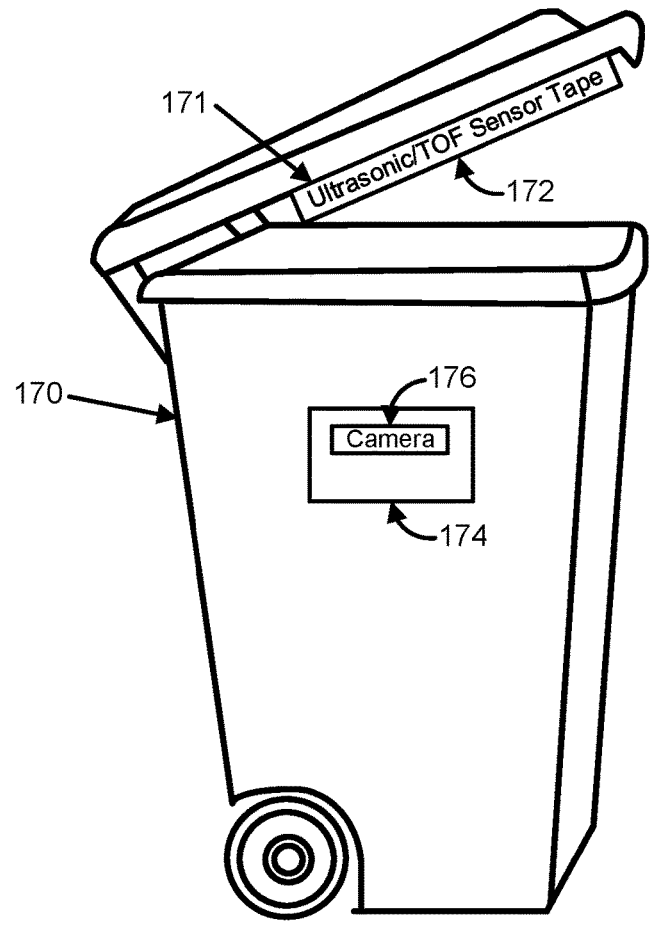

FIG. 3

| WIRELESS AGENT ATTRIBUTES TABLE ||| 129 |
|---|---|---|
| MASTER AGENT | SECONDARY AGENT | TERTIARY AGENT |
| Child Node | Intermediate Parent Node | Parent Node |
| Low Power Communications Interface (White) | Low and Medium Power Communications Interfaces (Green) | Low, Medium, High Power Communications Interfaces (Black) |
| Bluetooth LE | Bluetooth LE<br>Lora | Bluetooth LE<br>LoRa<br>Cellular<br>NFC<br>RFID |

FIG. 4

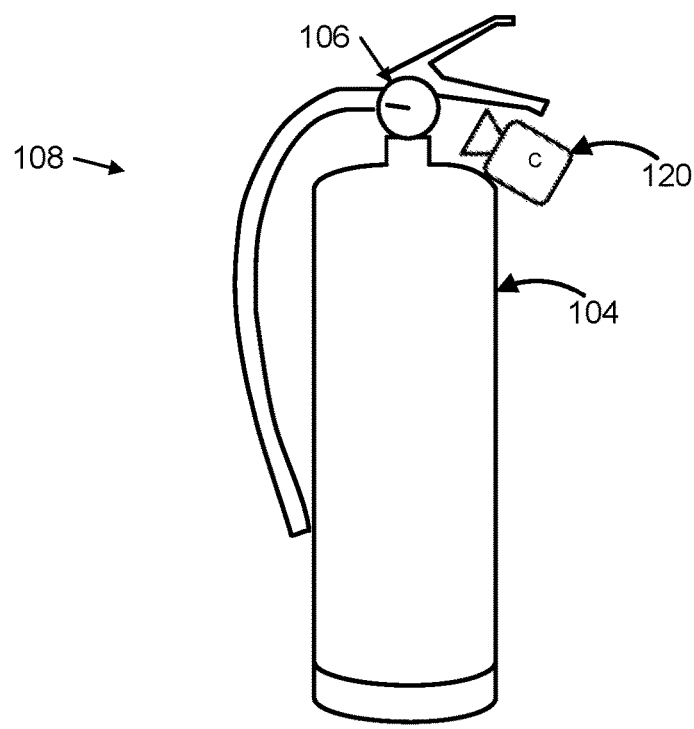
FIG. 9A
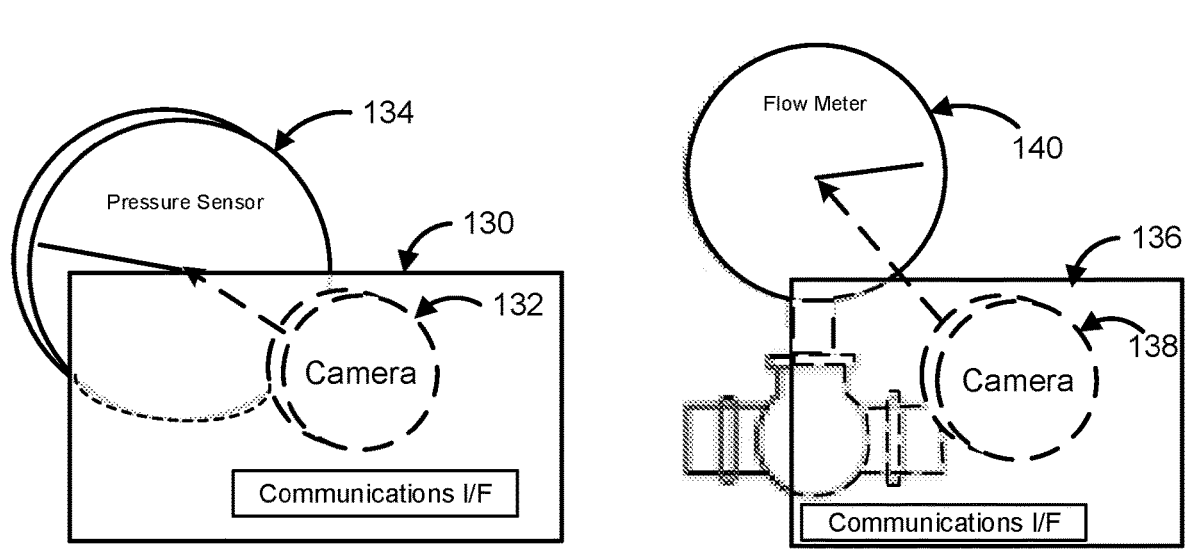
FIG. 9B
FIG. 9C

INVISIBLE INDUSTRIAL INTERNET-OF-THINGS

RELATED APPLICATIONS

This application claims priority to U.S. Patent Application Ser. No. 63/047,966, titled "INVISIBLE INDUSTRIAL INTERNET-OF-THINGS", filed Jul. 3, 2020, and incorporated herein by reference.

FIELD OF THE DISCLOSURE

The disclosure generally relates in part to wireless communications networks for industrial internet-of-things (IoT) and more particularly to asset management, including tracking, warehousing, inventorying, and monitoring items, objects, storage containers, and safety devices.

BACKGROUND

Wireless node networks traditionally are implemented as centralized or tree-based network topologies in which a small set of nodes are directly linked to each other hierarchically. Star and tree topologies are non-linear data structures that organize objects hierarchically. These topologies consist of a collection of nodes that are connected by edges, where each node contains a value or data, and each node may or may not have a child node. Oftentimes, the nodes of a wireless sensor network are organized hierarchically according to the roles and attributes of the nodes (e.g., communications range, battery life, processor clock rate, etc.). For example, the nodes of a wireless-sensor network may be organized as a hierarchical tree structure with one or more short range, low-power child nodes populating the bottom level of the tree structure, and a high-power master node at a higher level of the tree structure to manage the child nodes.

In many real-world applications, electronics devices do not have form factors and features that complement the shapes and form of associated physical objects. In particular, when using electronic tracking devices to track the condition and environment of physical assets, tracking devices with traditional electronics design and housing structures may add unwanted bulk and weight to the assets. It is desirable to have electronics devices that can integrate with physical objects in an unobtrusive way. In some cases, it may be desirable to have electronic tracking devices hidden or obscured from view.

SUMMARY

According to embodiments of the present disclosure, a method may include a first intelligent node collecting sensor data of fluid within a confined space within proximity of the intelligent node. The method may further include the first intelligent node analyzing the sensor data to determine a level of fluid within the confined space. The method may further include the first intelligent node comparing the level of fluid within the confined space to a predetermined level of fluid. The method may further include determining, based on comparing the level of fluid within the confined space to the predetermined level of fluid, that a fluid threshold is satisfied. The method may further include first intelligent node transmitting the sensor data to a wireless network in response to determining that the fluid threshold is satisfied.

According to embodiments of the present disclosure, a safety-apparatus monitoring system includes an intelligent node having a processor and a memory communicatively coupled with the processor, storing machine readable instructions that, when executed by the processor, cause the processor to synchronize with a client device. The processor may further monitor, using at least one sensor, a safety apparatus that stores fluid, the intelligent node being attached to the safety apparatus. The processor may further detect when maintenance of the safety apparatus occurs. The processor may further transmit a notification to the client device that maintenance is scheduled for the safety apparatus within a period of time. The processor may further receive a confirmation from the client device that maintenance of the safety apparatus is complete.

According to embodiments of the present disclosure, a network of intelligent nodes includes a first intelligent node having a first processor, a first memory communicatively coupled with the first processor and storing machine-readable instructions that, when executed by the first processor, cause the first processor to collect sensor data of fluid within a confined space within proximity of the intelligent node. The machine-readable instructions may cause the first processor to analyze the sensor data to determine a level of fluid within the confined space. The machine-readable instructions may cause the first processor to compare the level of fluid within the confined space to a predetermined level of fluid. The machine-readable instructions may cause the first processor to determine, based on comparing the level of fluid within the confined space to the predetermined level of fluid, that a fluid threshold is satisfied. The machine-readable instructions may cause the first processor to transmit the sensor data to a wireless network in response to determining that the fluid level is satisfied.

DESCRIPTION OF DRAWINGS

FIG. 3 shows a storage container that includes a camera and one of more of an ultrasonic sensor tape and a time-of-flight sensor tape to determine the current level and/or type of fluid within the storage container, according to an embodiment.

FIG. 4 is a table of attributes of three different types of agents: a master agent, a secondary agent, and a tertiary agent, according to an embodiment.

FIG. 9A is a diagrammatic view of a fire extinguisher with a camera configured to capture images of a pressure sensor gauge of the fire extinguisher, according to an embodiment.

FIG. 9B shows a diagrammatic view of a camera embedded in an agent platform positioned to capture images of a pressure sensor gauge of the fire extinguisher, according to an embodiment.

FIG. 9C shows a diagrammatic view of a camera embedded in an agent platform positioned to capture images of a flow meter gauge of a pipe, according to an embodiment.

DETAILED DESCRIPTION

Figure 1:
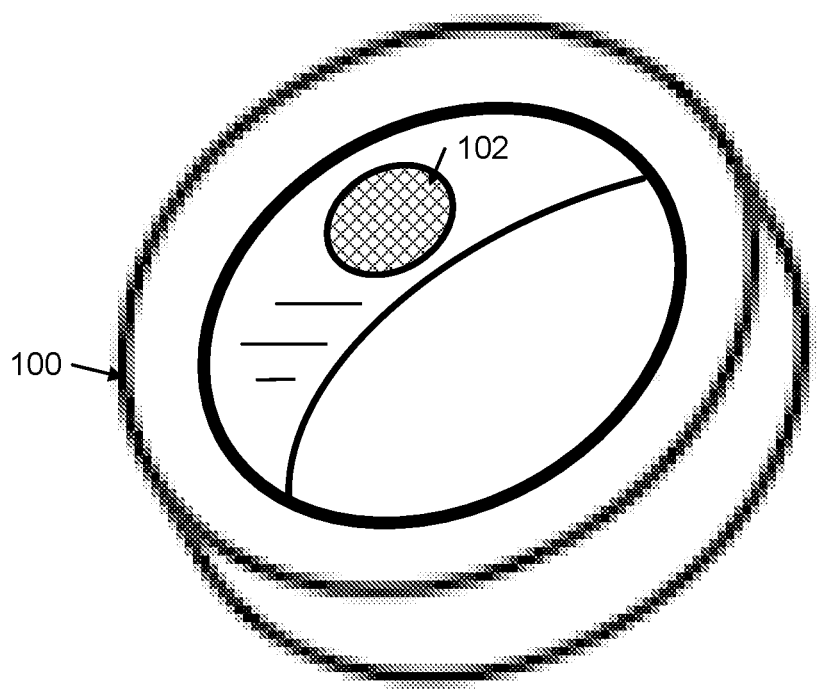
FIG. 1 is a diagrammatic view of a ring platform that includes a sensor, according to an embodiment.

The present invention is not limited in any way to the illustrated embodiments. Instead, the illustrated embodiments described below are merely examples of the invention. Therefore, the structural and functional details disclosed herein are not to be construed as limiting the claims. The disclosure merely provides bases for the claims and representative examples that enable one skilled in the art to make and use the claimed inventions. Furthermore, the terms and phrases used herein are intended to provide a comprehensible description of the invention without being limiting.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

In some contexts, the term "agent" may refer to a "node", and an "agent" or "node" may be adhesively applied to a surface and denoted as a "tape node" or "tape agent". These terms may be used interchangeably, depending on the context. Further, the "agent" or "node" may have two forms of hierarchy: one depending on the functionality of the "agent" or "node", such as the range of a wireless communication interface, and another depending on which "agent" or "node" may control another "agent" or "node". For example, an agent with a low-power wireless-communication interface may be referred to a "master agent".

In some embodiments, a low-power wireless communication interface may have a first wireless range and be operable to implement one or more protocols including Zigbee, near-field communication (NFC), Bluetooth Low Energy, Bluetooth Classic, Wi-Fi, and ultra-wideband. For example, the low-power wireless-communication interface may have a range of between 0 and 300 meters or farther, depending on the implemented protocol. The communication interface implementation, e.g., Zigbee or Bluetooth Low Energy, may be selected based upon the distance of communication between the low-power wireless-communication interface and the recipient, and/or a remaining battery level of the low-power wireless-communication interface.

An agent with a medium-power wireless communication-interface may be referred to as a "secondary agent". The medium-power wireless communication interface may have a second wireless range and be operable to implement one or more protocols including Zigbee, Bluetooth Low Energy interface, LoRa. For example, the medium-power wireless-communication interface may have a range of between 0 and 20 kilometers. The communication interface implementation, e.g., Zigbee, Bluetooth Low Energy, or LoRa, may be selected based upon the distance of communication between the medium-power wireless-communication interface and the recipient, and/or a remaining battery level of the medium-power wireless-communication interface.

An agent with a high-power wireless communication-interface may be referred to as a "tertiary agent". The high-power wireless communication interface may have a third wireless range and be operable to implement one or more protocols including Zigbee, Bluetooth Low Energy, LoRa, Global System for Mobile Communication, General Packet Radio Service, cellular, near-field communication, and radio-frequency identification. For example, the high-power wireless-communication interface may have a global range, where the high-power wireless-communication interface may communicate with any electronic device implementing a similar communication protocol. The communication interface protocol selected may depend on the distance of communication between the high-power wireless-communication interface and a recipient, and/or a remaining battery level of the high-power wireless-communication interface.

In some examples, a secondary agent may also include a low-power wireless-communication interface and a tertiary agent may also include low and medium-power wireless-communication interfaces, as discussed below with reference to FIGS. 7A-C and/or 8A-C. Further continuing the example, a "master agent", a "secondary agent", or a "tertiary agent" may refer to a "master tape node", a "secondary tape node", or a "tertiary tape node".

With regard to the second form of hierarchy, the "agent", "node", "tape agent", and "tape node", may be qualified as a parent, child, or master, depending on whether a specific "agent" or "node" controls another "agent" or "node". For example, a master-parent agent controls the master-child agent and a secondary or tertiary-parent agent controls a master-child agent. The default, without the qualifier of "parent" or "child" is that the master agent controls the secondary or tertiary agent Further, the "master tape node" may control a "secondary tape node" and a "tertiary tape node", regardless of whether the master tape node is a parent node.

Further, each of the "agents", "nodes", "tape nodes", and "tape agents" may be referred to as "intelligent nodes", "intelligent tape nodes", "intelligent tape agents", and/or "intelligent tape agents" or any variant thereof, depending on the context and, for ease, may be used interchangeably.

An adhesive tape platform includes a plurality of segments that may be separated from the adhesive product (e.g., by cutting, tearing, peeling, or the like) and adhesively attached to a variety of different surfaces to inconspicuously implement any of a wide variety of different wireless communications-based network communications and transducing (e.g., sensing, actuating, etc.) applications. In certain embodiments, each segment of an adhesive tape platform has an energy source, wireless communication functionality, transducing functionality (e.g., sensor and energy harvesting functionality), and processing functionality that enable the segment to perform one or more transducing functions and report the results to a remote server or other computer system directly or through a network (e.g., formed by tape nodes and/or other network components). The components of the adhesive tape platform are encapsulated within a flexible adhesive structure that protects the components from damage while maintaining the flexibility needed to function as an adhesive tape (e.g., duct tape or a label) for use in various applications and workflows. In addition to single function applications, example embodiments also include multiple transducers (e.g., sensing and/or actuating transducers) that extend the utility of the platform by, for example, providing supplemental information and functionality relating characteristics of the state and/or environment of, for example, an article, object, vehicle, or person, over time.

Systems and processes for fabricating flexible multifunction adhesive tape platforms in efficient and low-cost ways also are described in US Patent Application Publication No. US-2018-0165568-A1. For example, in addition to using roll-to-roll and/or sheet-to-sheet manufacturing techniques, the fabrication systems and processes are configured to optimize the placement and integration of components within the flexible adhesive structure to achieve high flexibility and ruggedness. These fabrication systems and processes are able to create useful and reliable adhesive tape platforms that may provide local sensing, wireless transmitting, and positioning functionalities. Such functionality together with the low cost of production is expected to encourage the ubiquitous deployment of adhesive tape platform segments and thereby alleviate at least some of the problems arising from gaps in conventional infrastructure coverage that prevent continuous monitoring, event detection, security, tracking, and other logistics applications across heterogeneous environments.

As used herein, the term "or" refers an inclusive "or" rather than an exclusive "or." In addition, the articles "a" and "an" as used in the specification and claims mean "one or more" unless specified otherwise or clear from the context to refer the singular form.

The terms "module," "manager," "component", and "unit" refer to hardware, software, or firmware, or a combination thereof.

FIG. 1 shows a ring platform 100 that may be made of a metal or plastic material. The ring platform 100 may be designed to securely attach to the top end of a fire extinguisher 108 between the top end of the body 104 of the fire extinguisher and a pressure gauge 106 (see FIG. 2). In some embodiments, the ring platform 100 includes a pressure sensor 102 (in some embodiments, the ring platform 100 may include a temperature sensor) that transmits pressure (or temperature) measurements, of the pressure gauge 106, to wireless electronic units (discussed with reference to FIGS. 5, 6, and 7A-C, 8A-C) within the ring platform 100 that are configured to wirelessly communicate the pressure or temperature measurements to a designated node (e.g., a network service). In some embodiments, the ring platform 100 may be configured to attach to the neck of the fire extinguisher 108 by a threaded connection or by a clamped connection with the top end of the fire extinguisher 108.

In some embodiments, a tape agent (discussed below) may be used, rather than the ring platform 100. Whether a tape agent or a ring platform 100 is used may depend on the object that the tape agent or ring platform 100 will adhere to, e.g., and may depend on the shape of the object. For example, the cylindrical shape of the neck of the fire extinguisher 108 or a pipe call for the ring platform 100 to be utilized; however, a flat surface, such as a side of a storage container, may warrant the use of a tape agent to adhesively apply. Furthermore, the tape agent may be used on a cylindrical or pipe-shaped fire extinguisher 108 where a ring platform 100 is difficult to attach thereto. Therefore, as used herein, the components of the ring platform 100 discussed herein may be included in a tape agent, and vice versa, such that where a ring platform 100 is referenced herein, the physical configuration may be that of a tape agent, and vice versa.

In some embodiments, ring platforms 100 (or tape agents including the components of the ring platform 100 as discussed herein) may be installed on pumps, pipes, and tubes and other equipment and receive wireless notification of pressure levels (e.g., pressure too high or too low) from pressure measurements of a pressure gauge (e.g., pressure gauge 106) or flow meter (e.g., flow meter 140, FIG. 9C) collected from the pressure sensor 102. Energy harvesting (e.g., the sensing transducer 56, 56', and 56", with reference to FIGS. 7A-C and 8A-C) units can be used to recharge batteries within the ring platform 100 and the amount of energy captured can be based on temperature differences, vibration, radiofrequency harvesting, or rotational motion. In some embodiments, inertial sensors (e.g., an accelerometer, gyroscope, etc.), within the ring platform 100 are used to detect movement of a fire extinguisher, which can be reported by a wireless transceiver in the ring platform 100. Further, authorized users may be automatically warned, by the ring platform 100, to know if an object that the ring platform 100 is attached to has been used. Examples of implementation of the ring platform 100 include automatically monitoring safety devices (e.g., chemical retardant within a fire extinguisher, batteries within a fire alarm, etc.) or toxic storage containers (e.g., chemical storage container, etc.) to determine when the safety devices should be replaced or the toxic storage containers should be emptied by authorized users. Thus, embodiments of the present disclosure may reduce liability from theft of dangerous products, safety devices malfunctioning, or chemical waste overflowing and, e.g., damaging property.

In some embodiments, the ring platform 100 transmits an alert to a tracking system (also referred to herein as a "wireless network"), in response to determining an event based on sensor data captured by the ring platform 100. For example, the ring platform 100 may determine that the pressure level or the fluid level of a container (e.g., a fire extinguisher, storage container, fluid container, fuel container, etc.), that the ring platform 100 is attached to, is low, below, or does not satisfy a threshold value. In response, the ring platform 100 transmits a notification to the tracking system. The notification may include a request for maintenance to be performed on the container or safety device that the ring platform 100 is attached to, such as having the container refilled or inspected. In some embodiments, the ring platform 100 may not have communication capabilities to transmit a notification to the tracking system. The ring platform 100 may instruct another ring platform or agent within a proximity of the communication capabilities of the ring platform 100 to transmit the notification to the tracking system. The ring platform 100 may send out a broadcast to nearby ring platforms or agents to determine which ring platforms or agents have the communication capabilities to communicate with the tracking system, and then select of those capable ring platforms and agents to transmit the notification to the tracking system.

In other embodiments, the ring platform 100 performs other actions in response to determining the event. For example, the ring platform 100 may increase data collection or sensitivity of sensors coupled to the ring platform 100 in response to detecting an event. In an example, the ring platform 100 may collect temperature sensor data from a coupled temperature sensor in response to detecting a pressure level that is outside of a normal range. In some embodiments, the ring platform 100 may instruct another ring platform within a proximity, that has a sensor not within the ring platform 100, to collect temperature sensor data by transmitting instructions to the other ring platform. The other ring platform may receive instructions and then collect temperature sensor data and transmit the temperature data to the ring platform 100 or transmit the temperature data to the wireless network, per instructions from the ring platform 100.

In some embodiments, the ring platform 100 can detect when maintenance on the fire extinguisher, or any device the ring platform is attached to (e.g., safety apparatus, such as a fire extinguisher, fire alarm, storage container, etc.), occurs. For example, the ring platform may reference data (e.g., in data 346, FIG. 11) within a database to determine a time and date of a scheduled maintenance. In some embodiments, the ring platform may detect when maintenance occurs by determining the pressure level of the chemical retardant within the fire extinguisher. The ring platform 100 may synchronize with a client device (e.g., a smartphone or any electronic device) of a human operator who performs routine maintenance on the fire extinguisher (e.g., or fire alarm, water pipe, toxic-storage container, etc.) being monitored. The wireless-communication interface (the wireless-communication interfaces 52, 52', 52", with reference to FIGS. 7A-C and 8A-C) within the ring platform 100 may transmit a notification to the synchronized client device that the routine maintenance is scheduled within a period of time (e.g., within a week, a day, the day of, etc.).

In other embodiments, the ring platform 100 issues instructions to the tracking system to perform maintenance on the attached device (e.g., safety device, fire extinguisher, storage container, etc.) based on the sensor data collected by the ring platform 100. In this case, the attached device and users of the attached device may not rely on a routine maintenance schedule but may instead perform maintenance based on the occurrence of events detected by the ring platform 100. The events may include the sensor data (e.g., pressure sensor data) falling within or outside of, or otherwise not satisfying specified ranges. For example, if the ring platform 100 detects a pressure that is lower than a threshold level for an attached fire extinguisher, the ring platform 100 may issue instructions to the tracking system to have a nearby human operator perform maintenance on the fire extinguisher (e.g., filling or replacing the fire extinguisher).

The client device may have an application that includes routine maintenance for a variety of safety devices (safety apparatuses) within one or more facilities. The human operator could confirm, within the application, in-person or remotely, that maintenance is complete. The ring platform 100 may then check the pressure of, or fluid level of chemical retardant within, the fire extinguisher, or any safety device the ring platform is attached to, to verify maintenance was properly performed. For example, the ring platform 100 may collect sensor data regarding the fluid level or pressure of chemical retardant within the fire extinguisher, and then analyze the sensor data to determine, by comparing the sensor data to predetermined data of sufficient fluid or pressure levels, that the maintenance was completed properly. The client device and/or the ring platform 100 may then send the data regarding the maintenance to a server or cloud for storage, or to the database where data (e.g., data 346) is stored.

Figure 2:
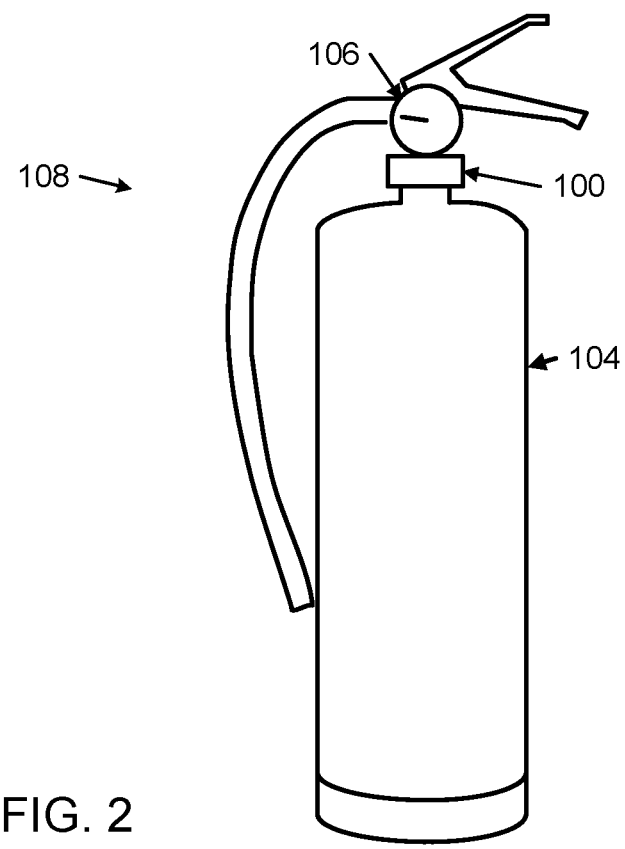
FIG. 2 is a diagrammatic view of the ring platform attached to an upper-portion of a fire extinguisher, according to an embodiment.

Now turning to FIG. 2, the ring platform 100 is attached to the fire extinguisher 108, between the top end of the body 104 of the fire extinguisher 108 and a pressure gauge 106. The pressure gauge 106 may be used to measure how much chemical retardant is remaining within the fire extinguisher 108. The ring platform 100 is configured to sense the pressure or temperature levels of, e.g., chemical retardant within the fire extinguisher 108 and wirelessly transmit the sensed pressure levels to a designated location (e.g., a network service). In some embodiments, the ring platform 100 may include an interface (not shown) that includes a pressure sensor (e.g., the pressure sensor 102, FIG. 1) that outputs pressure values over time to the designated location (e.g., a station monitoring an area where the fire extinguisher is located). In some embodiments, the ring platform 100 transmits a wireless alert to the designated location (e.g., a server, remote device, etc. associated with the station) when the pressure value of the chemical retardant of the fire extinguisher drops below a threshold level.

In some embodiments, the ring platform 100 may include or be coupled to an alarm system, display, or indicator. For example, the ring platform may include a speaker, a digital display (LED), or a device that can alert/notify people within a proximity of the ring platform. For example, the ring platform 100 may instruct the speaker to output an audible message that the fire extinguisher is in need of maintenance (e.g., needs to be replaced, refilled, inspected, etc.). Similarly, the ring platform 100 may instruct the digital display to output a visual message that the fire extinguisher is in need of maintenance. In some embodiments, the ring platform 100 may instruct the digital display to output a message notifying any users that the attached device (e.g., fire extinguisher) is in acceptable conditions for use, if the data collected by the ring platform 100 indicates that the attached device is within suitable range of conditions. Conversely, the ring platform 100 may instruct the digital display to output a message warning users not to use the attached device, if the ring platform 100 detects that the attached device is not within a suitable range of conditions. Each of the outputted messages may include contact information of a human operator, or of a client device of the human operator, to alert regarding performing maintenance on the fire extinguisher. In cases where the ring platform 100 does not include an alarm system or display integrated with the ring platform 100, the ring platform 100 may wirelessly communicate with an alarm system or display, according to some embodiments.

FIG. 3 shows a storage container 170 (e.g., a toxic waste storage container) that includes an ultrasonic sensor 171 and/or a time-of-flight sensor 172 embedded within a tape agent 174, that is attached to the storage container. The sensors 171, 172 may measure the level of fluid (e.g., chemical/toxic waste, oil, etc.) within the storage container 170. The ultrasonic sensor 171 and/or the time-of-flight sensor 172 may be adhesively attached to the underside of the storage container 170 lid. The storage container 170 may also include a tape agent 174 with an embedded camera 176 attached to the inner wall of the storage container 170 and configured to detect the type (e.g., toxic or chemical waste, battery acid, oil, etc.) of waste that is deposited in the storage container 170. When the ultrasonic sensor 171 or the time-of-flight sensor 172 detects that the depth of the waste in the storage container 170 satisfies a threshold depth, either the ultrasonic sensor 171 or the time-of-flight wireless 172 sends an alarm or an alert to a designated location (e.g., a network service, server, client device of an authorized user, etc.). Similarly, when the camera 176 detects that an improper item has been deposited in the storage container 170, the wireless components in the tape agent 174 send an alarm or an alert to the designated location (e.g., a network service).

In some embodiments, a microphone may be inside the inner wall of the storage container 170, and may be embedded within the tape agent 174, along with the camera 176. In some embodiments, the camera 176 may determine the depth of the waste within the storage container 170 to determine when to empty the storage container 170. For example, any of the camera 176, ultrasonic sensor 171, or time-of-flight sensor 172 may determine the level of fluid inside the storage container 170. For example, waste management may be more practical in that time will not be spent by individuals manually determining which storage containers of a plurality of storage containers within an area are full, but rather the sensors 171, 172, and 176 may automatically determine how to allocate time to empty storage containers 170 that are or near full. In some embodiments, a digital map representative of one or more storage containers within an area may be generated and updated in real-time with sensor data collected from, and transmitted by, the tape agent 174 that include the sensors 171, 172, and 176 attached to the storage containers. Authorized users may reference this remotely and/or may be alerted when the tape agents, e.g., transmit an alert to a mobile device of the authorized user in response to waste within a storage container satisfying a threshold depth.

In some embodiments, the tape agent 174 (that is associated with the camera 176), ultrasonic sensor 171, or time-of-flight sensor 172 may each include, or are each coupled to, an alarm system, display, or indicator. For example, the sensors 171, 172 and/or tape agent 174 may include a speaker, a digital display (LED), or a device that can alert/notify people within a proximity of the sensors 171, 172 and/or tape agent 174. For example, the sensors 171, 172 and/or tape agent 174 may instruct the speaker to output an audible message that the storage container 170 is in need of maintenance (e.g., needs to be replaced, refilled, inspected, etc.). Similarly, the sensors 171, 172 and/or tape agent 174 may instruct the digital display to output a visual message that the storage container 170 is in need of maintenance. In some embodiments, the sensors 171, 172 and/or tape agent 174 may instruct the digital display to output a message notifying any users that the attached device is in acceptable conditions for use, if the data collected by sensors 171, 172 and/or tape agent 174 indicates that the attached device is within suitable range of conditions. Conversely, the sensors 171, 172 and/or tape agent 174 may instruct the digital display to output a message warning users not to use the attached device, if the sensors 171, 172 and/or tape agent 174 detects that the attached device is not within a suitable range of conditions. Each of the outputted messages may include contact information of a human operator or of a client device of a human operator to alert regarding performing maintenance on the storage container 170. In cases where the sensors 171, 172 and/or tape agent 174 does not include an alarm system or display integrated with the sensors 171, 172 and/or tape agent 174, the sensors 171, 172 and/or tape agent 174 may wirelessly communicate with an alarm system or display, according to some embodiments.

In some embodiments, any of the camera 176, ultrasonic sensor 171, or time-of-flight sensor 172 may detect when maintenance on the storage container 170 (or any device the camera 176, ultrasonic sensor 171, or time-of-flight sensor 172 are attached to) occurs. The camera 176, ultrasonic sensor 171, or time-of-flight sensor 172 may synchronize with a client device (e.g., a smartphone or any electronic device) of a human operator who performs routine maintenance on the storage container 170 being monitored. The wireless-communication interface (the wireless-communication interfaces 52, 52', 52", with reference to FIGS. 7A-C and 8A-C) within the tape agent 174 (that is associated with the camera 176), ultrasonic sensor 171, or time-of-flight sensor 172 may transmit a notification to the synchronized client device that the routine maintenance is scheduled within a period of time (e.g., within a week, a day, the day of, etc.). The client device may have the application that includes routine maintenance for a variety of safety devices, including the storage container, within one or more facilities. The human operator could confirm, within the application, in-person or remotely, that maintenance is complete. The camera 176, ultrasonic sensor 171, or time-of-flight sensor 172 may then check the fluid level of the storage container 170 to verify that maintenance was properly performed by determining that the fluid level is below a fluid threshold. The client device and/or the ring platform 100 may then send the data (e.g., data 346) regarding the maintenance to a server or cloud or to a database.

The tape agents and ring platforms, as discussed in the previous FIGS. 1-3, may come in a variety of types, including a master agent, a secondary agent, and a tertiary agent, each of which may attach to an object, such as a fire extinguisher, storage container, vehicle, building, etc. In some embodiments, the master agents may be attached to fire extinguishers, fire alarms, or storage containers, while the secondary agents are attached to vehicles, trains, ships, and/or planes that may transport those items or on walls of buildings that include a number of those items within a proximity (e.g., fifty feet, one hundred feet, etc.), such as buildings within a shipping port or airport; and, tertiary agents may be attached to infrastructure, such as a building that includes a plurality of secondary agents and master agents within an area (e.g., two hundred feet, three hundred, a city block, an entire shipping port or airport, etc.). In some embodiments, there may be more tertiary agents for every secondary agent. A plurality of the various kinds of agents may form a network and adhere to attributes that are instructions stored as a table in memory.

The instant specification describes an example single or a collection (network) of ring platforms and/or agents (also referred to herein as "tape agents" or "tape nodes" interchangeably) that may be used to implement a low-cost wireless network infrastructure for performing monitoring, tracking, and maintaining (e.g., all of which may utilize IoT devices) relating to, for example, safety devices (e.g., fire extinguishers, fire alarms, etc.), chemical storage containers, and other physical assets and objects. The example network includes a set of three different types of agents that have different respective functionalities and different respective cover markings that visually distinguish the different agent types from one another. Other systems may include fewer than three or more than three different types of agents. In one non-limiting example, the covers of the different agent types may be marked with different colors (e.g., white, green, and black). Further, the different agent types also are distinguishable from one another by their respective wireless communications capabilities and their respective sensing capabilities.

FIG. 4 is a table 129 showing attributes of the three different types of agents and/or ring platforms: master agent, secondary agent, and tertiary agent. This table 129 may be preprogrammed into the memory (e.g., 58, 58', 58", FIG. 7A-C) of each agent, where the processors (e.g., 50, 50', 50", FIG. 7A-C) of each agent may execute instructions according to the role of each agent. The left column of table 129 lists the attributes of the master agent. Among the attributes of the master agent are a master agent role (e.g., the agent may have a role that includes directing other agents to perform predetermined functions, such as instructing other master agents, or secondary or tertiary agents, to perform the predetermined functions); a child agent (e.g., the child agent may have a role that includes being directed by a parent agent to perform predetermined functions according to the parent-agent's instructions) placement in physical premises (a peripheral or leaf node placement); and a low-power wireless-communications interface (e.g., a Bluetooth LE communications interface or a Zigbee communications interface). The master agent role attribute enables the master agent to exercise unilateral control over other non-master types of agents, such as a secondary agent and a tertiary agent. However, when the secondary or tertiary agent is a parent and the master agent is a child, the parent may instruct the child to perform tasks. The child node attribute configuration corresponds to a peripheral end node or leaf node that interacts in a particular environment (e.g., physical premises, such as a building, warehouse, loading dock, etc.).

In some embodiments, rather than a server being an end node, the end nodes or leaf nodes may be a master agent. In some embodiments, the end nodes may have high-power or medium-power wireless-communication interfaces. The end nodes attach to and directly track and monitor assets (e.g., the safety devices and containers). For example, the end node may be a ring platform 100, sensors 171, 172, or the tape agent 174, attached to a safety device or storage container, and transmit the collected sensor data pertaining to the assets to other nodes (e.g., secondary or tertiary nodes). The end nodes (master agents) may drive the flow of information and determine when to transmit the sensor data or any information pertaining to the assets. This way, the flow of information is dictated by the end nodes and the secondary and tertiary nodes do not lose battery power constantly listening for when the master agents (end nodes) transmit the sensor data. In the illustrated embodiment, the master-child node has a low power communications interface (e.g., Bluetooth LE) for communicating with other nodes (secondary and tertiary agents) over short distance wireless communications links, as discussed in FIG. 7A.

In some embodiments, the master agents may request resources or data from the secondary and tertiary agents. The requested resources may be to complete specific functions or tasks that the master agent is configured to perform. In some cases, the master agent does not have the capabilities, components, or configuration associated with the requested resources or data, and may rely on the secondary and tertiary agents to provide the resources and data. For example, a master agent may not include a GPS sensor, but may determine its relative location by requesting location data from a secondary or tertiary agent nearby that is equipped with a GPS sensor.

The center column of table 129 lists the attributes of the secondary agent. Among the attributes of the secondary agent are a secondary agent role (e.g., the secondary agent may include a medium-power wireless-communication interface, such as indicated with reference to FIG. 7B, that may communicate with a stationary or mobile gateway); an intermediate parent-node placement in a physical premises within communication range of one or more child nodes (e.g., a master agent child node) and optionally within communication range of one or more of the tertiary agent parent nodes; and low and intermediate-power wireless-communications interfaces (e.g., Bluetooth LE and LoRa communications interfaces). The intermediate parent-node attribute configuration corresponds to an intermediate node that communicates with the child nodes in the physical premises and communicates with the tertiary agent. In the illustrated embodiment, the secondary agent may also have a low-power wireless-communications interface (e.g., Bluetooth LE communications interface) for communicating with the child nodes and a medium-power wireless-communications interface (e.g., LoRa communications interface) for communicating with a parent node (e.g., a tertiary agent) or server node (e.g., a stationary gateway) over longer-distance wireless-communication links. In the illustrated embodiment, the communications interfaces of the secondary tape agent are backward compatible with the child nodes.

The right column of table 129 lists the attributes of the tertiary agent. Among the attributes of the tertiary agent are a tertiary agent role; a placement in relation to the physical premises that is within range of the of the secondary agent and optionally within communication range of one or more of the master agents; and low, intermediate, and high-power communications interfaces (e.g., with reference to FIG. 7C, that may include Bluetooth LE, LoRa, Cellular, NFC, and RFID communications interfaces) for communicating with the master and secondary agents. In the illustrated embodiment, the communications interfaces of the tertiary agent are backward compatible with the master and secondary agents.

A master agent (master node) may include a low-power wireless-communication interface configured to communicate with secondary and tertiary agents (intelligent nodes) within a proximity (e.g., wireless range) of the low-power wireless-communication interface. A secondary agent (node) may be configured to execute instructions received from the master agent (master node) and the secondary agent may include one or both of a low-power wireless-communication interface and a medium-power wireless-communication interface. The medium-power wireless-communication interface may have a longer range of communication than the low-power wireless-communication interface, as discussed above. A tertiary agent (tertiary node) may be configured to execute instructions received from the master agent (master node) and the tertiary node may include one or more of a low-power wireless-communication interface, a medium-power wireless-communication interface, and a high-power wireless-communication interface. The high-power wireless-communication interface may have a longer range of communication than the low-power wireless-communication and medium-power wireless-communication interfaces and may be configured to wirelessly communicate with a server associated with the network.

In some embodiments, the ring platform 100, sensors 171, 172, or the tape agent 174 may be a master agent with a low-power wireless-communication interface configured to communicate with secondary and tertiary agents (e.g., client device, server, an agent or intelligent node attached to a structure, such as a wall or shipping container, or a ship, train, vehicle, or other mode of transportation, etc.). The master agent may transmit instructions to the secondary or tertiary agent to perform tasks, such as monitoring an asset (e.g., a safety device or storage container), communicating with, and transmitting a notification to, a server or client device, displaying a digital or audible message to nearby individuals that maintenance of safety devices or storage containers is required, or any task that the ring platform 100, sensors 171, 172, or the tape agent 174 may perform, as discussed herein. For example, the master agent (e.g., ring platform 100, sensors 171, 172, or the tape agent 174) may transmit instructions to the secondary or tertiary agent to collect sensor data from the safety device or storage container and then determine the fluid levels in a substantially similar manner as the ring platform 100, sensors 171, 172, or the tape agent 174 determines the fluid levels, as discussed herein. In some embodiments, the master agent may determine which secondary and/or tertiary agents are capable of performing tasks based on their computing modules (e.g., processing units, sensor transducer, etc.), and then assign a particular secondary or tertiary agent to perform a task. The secondary or tertiary agent selected to perform the task may then execute the computer-readable instructions, received from the master agent, to perform the task.

Figure 5:
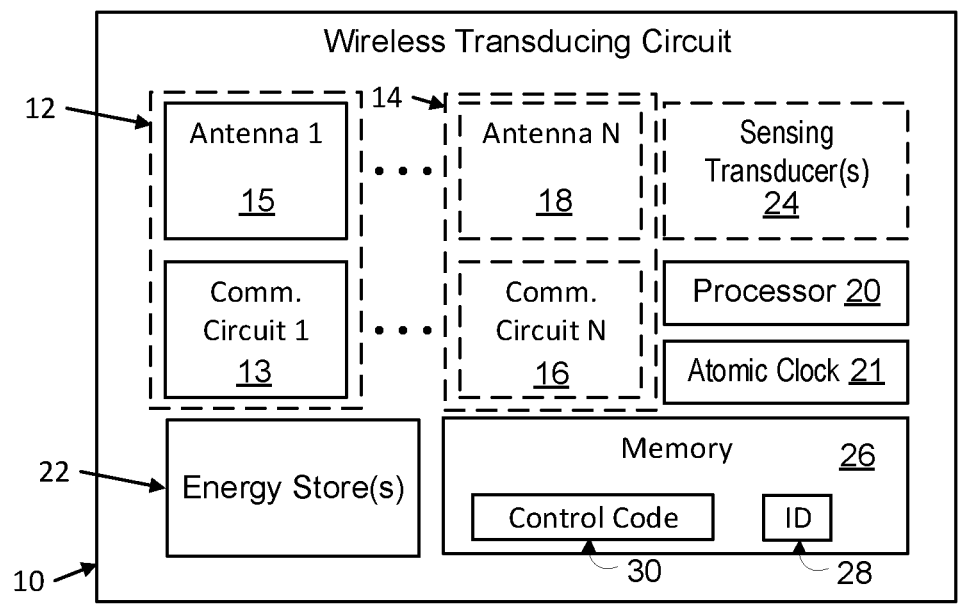
FIG. 5 is a schematic view of an example wireless transducer circuit, according to an embodiment.

FIG. 5 shows a block diagram of the components of an example wireless transducing circuit 10 (e.g., an agent) that includes one or more wireless communication modules 12, 14. Each wireless communication module 12, 14 includes a wireless communication circuit 13, 16, and an antenna 15, 18, respectively. Each wireless communication circuit 13, 16 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 10 also includes a processor 20 (e.g., a microcontroller or microprocessor), a solid-state atomic clock 21, at least one energy store 22 (e.g., non-rechargeable or rechargeable printed flexible battery, conventional single or multiple cell battery, and/or a super capacitor or charge pump), one or more sensing transducers 24 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 10.

Sensing transducers 24 may represent one or more of a capacitive sensor, an altimeter, a gyroscope, an accelerometer, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 10 includes a memory 26 for storing data, such as profile data, state data, event data, sensor data, localization data, security data, and/or at least one unique identifier (ID) 28 associated with the wireless transducing circuit 10, such as one or more of a product ID, a type ID, and a media access control (MAC) ID. Memory 26 may also store control code 30 that includes machine-readable instructions that, when executed by the processor 20, cause processor 20 to perform one or more autonomous agent tasks. In certain embodiments, the memory 26 is incorporated into one or more of the processor 20 or sensing transducers 24. In other embodiments, memory 26 is integrated in the wireless transducing circuit 10 as shown in FIG. 5. The control code 30 may implement programmatic functions or program modules that control operation of the wireless transducing circuit 10, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 10. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 6:
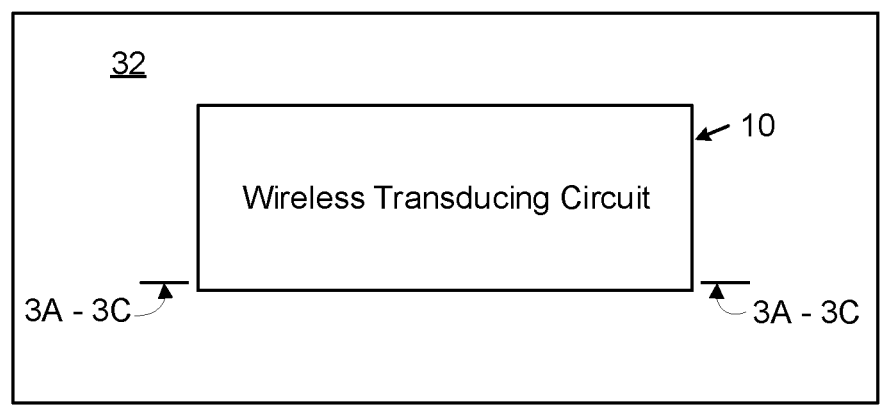
FIG. 6 is a diagrammatic top view of a platform containing an embedded wireless transducing circuit, according to an embodiment.

FIG. 6 is a top view of a generic platform 32 for the wireless transducing circuit 10. In some embodiments, multiple platforms 32 may each contain respective sets of components that are identical and configured in the same way. In other embodiments, multiple platforms 32 may each contain respective sets of components that differ and/or are configured in different ways. For example, different ones of the platforms 32 have different sets or configurations of tracking and/or transducing components that are designed and/or optimized for different applications. Also, or alternatively, different sets of segments of the platform 32 may have different ornamentations (e.g., markings on the exterior surface of the platform) and/or different dimensions.

An example method of fabricating the platform 32 (with reference to FIG. 6) uses to a roll-to-roll fabrication process as described in connection with FIGS. 6, 7A, and 7B of U.S. patent application Ser. No. 15/842,861, filed Dec. 14, 2017, the entirety of which is incorporated herein by reference.

Figure 7A:
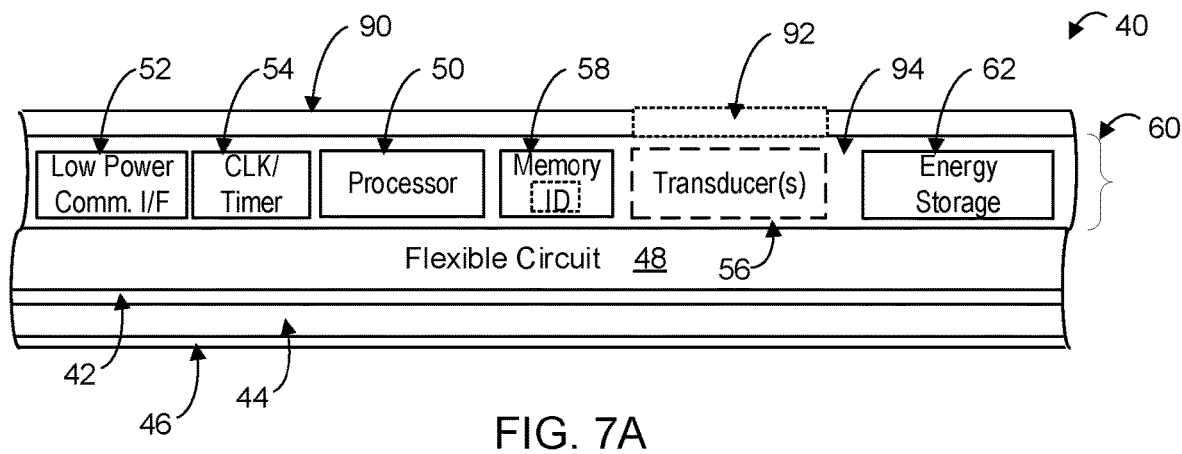
FIGS. 7A-C show diagrammatic cross-sectional side views of portions of different respective agents, according to various embodiments.

FIG. 7A shows a cross-sectional side view of a portion of an example segment 40 of a flexible adhesive tape agent platform (e.g., platform 32 of FIG. 6) that includes a respective set of the components of the wireless transducing circuit 10 corresponding to the first tape-agent type (e.g., white). The segment 40 includes an adhesive layer 42, an optional flexible substrate 44, and an optional adhesive layer 46 on the bottom surface of the flexible substrate 44. When the bottom adhesive layer 46 is present, a release liner (not shown) may be (weakly) adhered to the bottom surface of the adhesive layer 46. In certain embodiments where adhesive layer 46 is included, the adhesive layer 46 is an adhesive (e.g., an acrylic foam adhesive) with a high-bond strength that is sufficient to prevent removal of the segment 40 from a surface on which the adhesive layer 46 is adhered to without destroying the physical or mechanical integrity of the segment 40 and/or one or more of its constituent components.

In certain embodiments including the optional flexible substrate 44, the optional flexible substrate 44 is a prefabricated adhesive tape that includes the adhesive layers 42 and 46 and the optional release liner. In other embodiments including the optional flexible substrate 44, the adhesive layers 42, 46 are applied to the top and bottom surfaces of the flexible substrate 44 during the fabrication of the adhesive tape platform. The adhesive layer 42 may bond the flexible substrate 44 to a bottom surface of a flexible circuit 48, that includes one or more wiring layers (not shown) that connect the processor 50, a low-power wireless-communication interface 52 (e.g., a Zigbee, Bluetooth® Low Energy (BLE) interface, or other low power communication interface), a clock and/or a timer circuit 54, transducing and/or transducer(s) 56 (if present), the memory 58, and other components in a device layer 60 to each other and to the energy storage device 62 and, thereby, enable the transducing, tracking and other functionalities of the segment 40. The low-power wireless-communication interface 52 typically includes one or more of the antennas 15, 18 and one or more of the wireless communication circuits 13, 16. The segment 40 may further include a flexible cover 90, an interfacial region 92, and a flexible polymer layer 94.

Figure 7B:
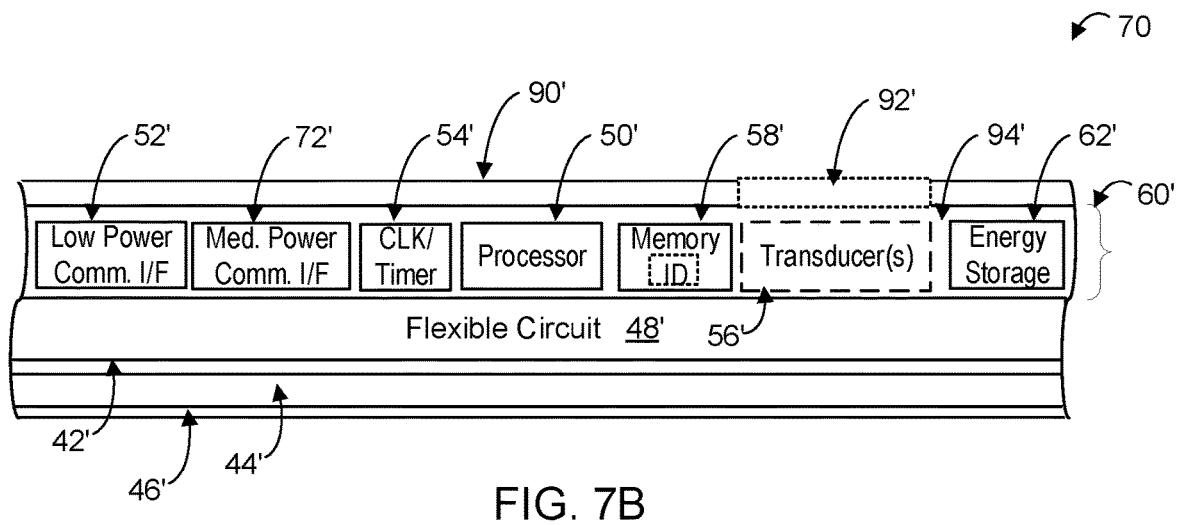

FIG. 7B shows a cross-sectional side-view of a portion of an example segment 70 of a flexible adhesive tape agent platform (e.g., platform 32 of FIG. 6) that includes a respective set of the components of the wireless transducing circuit 10 corresponding to a second tape-agent type (e.g., green). The segment 70 is similar to the segment 40 shown in FIG. 7A but further includes a medium-power communication-interface 72' (e.g., a LoRa interface) in addition to the low-power communications-interface 52. The medium-power communication-interface 72' has a longer communication range than the low-power communication-interface 52'. In certain embodiments, one or more other components of the segment 70 differ from the segment 40 in functionality or capacity (e.g., larger energy source). The segment 70 may include further components, as discussed above and below with reference to FIGS. 7A, and 7C.

Figure 7C:
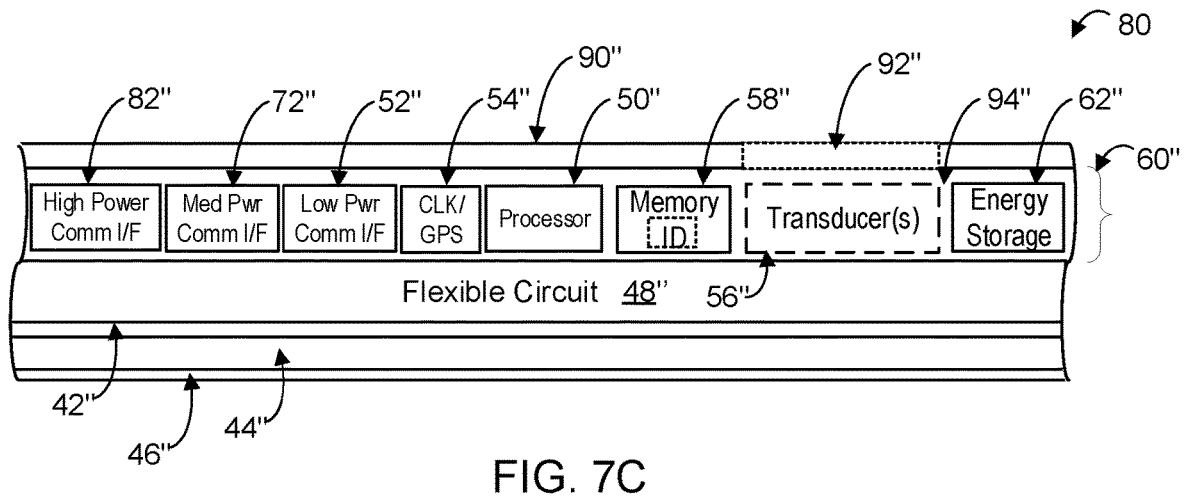

FIG. 7C shows a cross-sectional side view of a portion of an example segment 80 of the flexible adhesive tape-agent platform that includes a respective set of the components of the wireless transducing circuit 10 corresponding to the third tape-node type (e.g., black). The segment 80 is similar to the segment 70 of FIG. 7B, but further includes a high-power communications-interface 82" (e.g., a cellular interface; e.g., GSM/GPRS) in addition to a low-power communications-interface 52", and may include a medium-power communications-interface 72". The high-power communications-interface 82" has a range that provides global coverage to available infrastructure (e.g. the cellular network). In certain embodiments, one or more other components of the segment 80 differ from the segment 70 in functionality or capacity (e.g., larger energy source).

FIGS. 7A-7C show embodiments in which the flexible covers 90, 90', 90" of the respective segments 40, 70, and 80 include one or more interfacial regions 92, 92', 92" positioned over one or more of the transducers 56, 56', 56". In certain embodiments, one or more of the interfacial regions 92, 92', 92" have features, properties, compositions, dimensions, and/or characteristics that are designed to improve the operating performance of the platform for specific applications. In certain embodiments, the flexible adhesive tape platform includes multiple interfacial regions 92, 92', 92" over respective transducers 56, 56', 56", which may be the same or different depending on the target applications. Interfacial regions may represent one or more of an opening, an optically transparent window, and/or a membrane located in the interfacial regions 92, 92', 92" of the flexible covers 90, 90', 90" that is positioned over the one or more transducers and/or transducers 56, 56', 56". Additional details regarding the structure and operation of example interfacial regions 92, 92', 92" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 94, 94', 94" encapsulates the respective device layers 60, 60', 60" and thereby reduces the risk of damage that may result from the intrusion of contaminants and/or liquids (e.g., water) into the device layer 60, 60', 60". The flexible polymer layers 94, 94', 94" may also planarize the device layers 60, 60', 60". This facilitates optional stacking of additional layers on the device layers 60, 60', 60" and also distributes forces generated in, on, or across the segments 40, 70, 80 so as to reduce potentially damaging asymmetric stresses that might be caused by the application of bending, torquing, pressing, or other forces that may be applied to the segments 40, 70, 80 during use. In the illustrated example, a flexible cover 90, 90', 90" is bonded to the planarizing polymer 94, 94', 94" by an adhesive layer (not shown).

The flexible cover 90, 90', 90" and the flexible substrate 44, 44', 44" may have the same or different compositions depending on the intended application. In some examples, one or both of the flexible cover 90, 90', 90" and the flexible substrate 44, 44', 44" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 90, 90', 90" and the adhesive layers 42, 42', 42", 46, 46', 46" on the top and bottom surfaces of the flexible substrate 44, 44', 44" typically include a pressure-sensitive adhesive (e.g., a silicon-based adhesive). In some examples, the adhesive layers are applied to the flexible cover 90, 90', 90" and the flexible substrate 44, 44', 44" during manufacture of the adhesive tape-agent platform (e.g., during a roll-to-roll or sheet-to-sheet fabrication process). In other examples, the flexible cover 90, 90', 90" may be implemented by a prefabricated single-sided pressure-sensitive adhesive tape and the flexible substrate 44, 44', 44" may be implemented by a prefabricated double-sided pressure-sensitive adhesive tape; both kinds of tape may be readily incorporated into a roll-to-roll or sheet-to-sheet fabrication process. In some examples, the flexible substrate 44, 44', 44" is composed of a flexible epoxy (e.g., silicone).

In certain embodiments, the energy storage device 62, 62', 62" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 52, 52', 52" and/or the processor(s) 50, 50', 50" may be integrated on the flexible battery substrate. In some examples, one or more of such components also (e.g., the flexible antennas and the flexible interconnect circuits) may be printed on the flexible battery substrate.

In examples of manufacture, the flexible circuit 48, 48', 48" is formed on a flexible substrate by one or more of printing, etching, or laminating circuit patterns on the flexible substrate. In certain embodiments, the flexible circuit 48, 48', 48" is implemented by one or more of a single-sided flex circuit, a double access or back-bared flex circuit, a sculpted flex circuit, a double-sided flex circuit, a multilayer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 40, 70, 80 shown in FIGS. 7A-7C, the flexible circuit 48, 48', 48" represents a single-access flex-circuit that interconnects the components of the adhesive tape platform on a single side of the flexible circuit 48, 48', 48". However, in other embodiments, the flexible circuit 48, 48', 48" represents a double access flex circuit that includes a front-side conductive pattern that interconnects the low-power communications interface 52, 52', 52", the timer circuit 54, 54', 54", the processor 50, 50', 50", the one or more sensor transducers 56, 56', 56" (if present), and the memory 58, 58', 58", and allows through-hole access (not shown) to a back-side conductive pattern that is connected to the flexible battery (not shown). In these embodiments, the front-side conductive pattern of the flexible circuit 48, 48', 48" connects the communications circuits 52, 52', 52", 72', 72", 82" (e.g., receivers, transmitters, and transceivers) to their respective antennas and to the processor 50, 50', 50" and also connects the processor 50, 50', 50" to the one or more sensors and the memory 58, 58', and 58". The backside conductive pattern connects the active electronics (e.g., the processor 50, 50', 50", the communications circuits 52, 52', 52", 72', 72", 82" and the transducers) on the front-side of the flexible circuit 48, 48', 48" to the electrodes of the energy storage device 62, 62', 62" via one or more through holes in the substrate of the flexible circuit 48, 48', 48".

The various units of the segments 40, 70, 80 shown in FIGS. 3A-3C may be arranged to accommodate different objects or structures (e.g., trash bins, fire extinguishers, etc.) and sensors may be added to, or subtracted from, the segments 40, 70, and 80, according to a particular task.

Figure 8A:
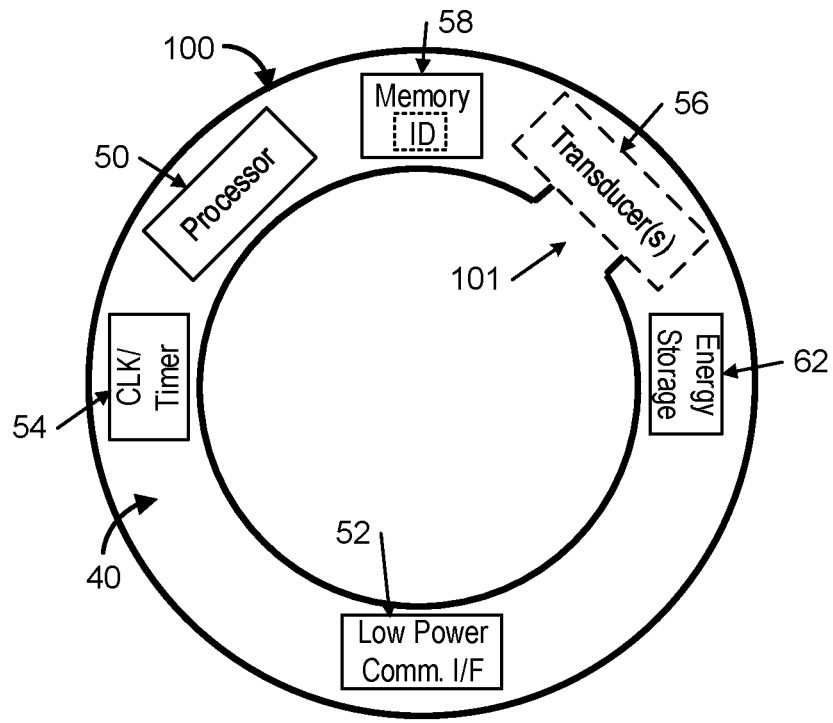
FIGS. 8A-C are diagrammatic views of ring platforms that house respective sets of the electronic components of corresponding ones of the different respective agents, according to an embodiment.
Figure 8B:
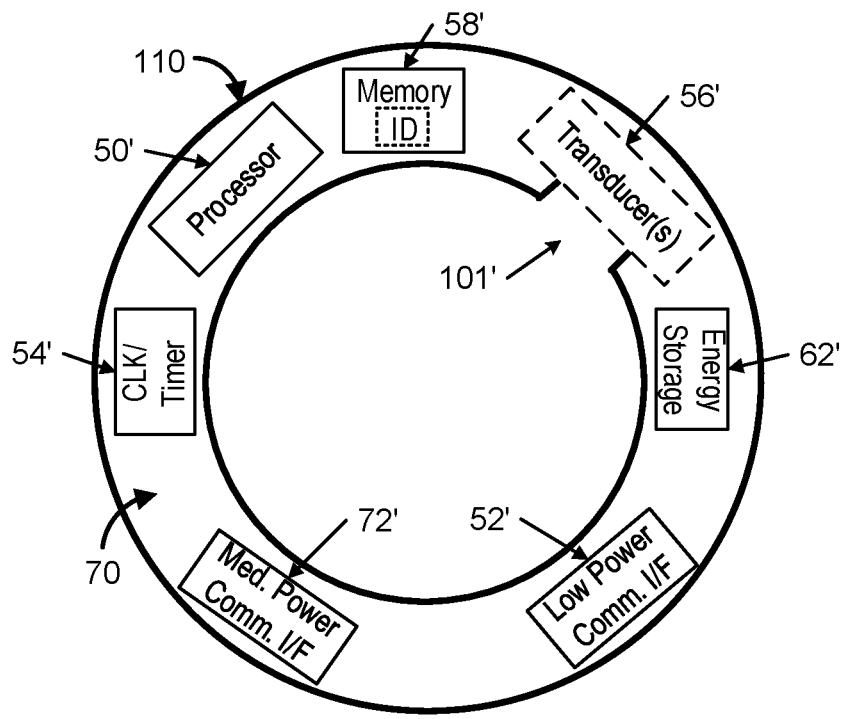
Figure 8C:
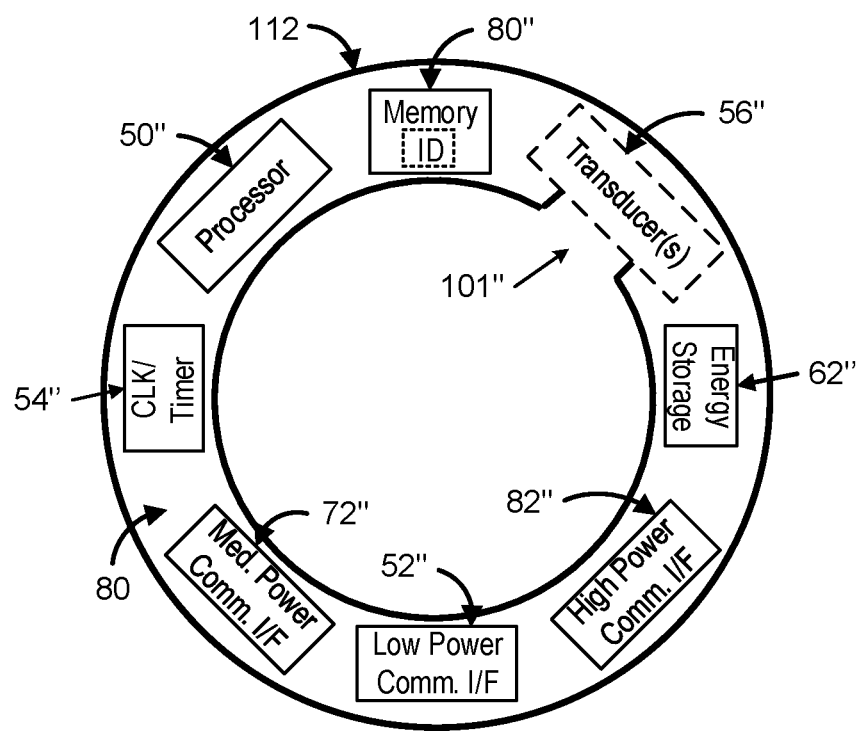

FIGS. 8A-C show the respective ring platforms 100, 110, 112 that house the segments 40, 70, 80 (FIGS. 7A-C) in a different configuration. These ring platforms 100, 110, and 112 differ from one another primarily by the number and power of their communications interfaces, as in the segments 40, 70, and 80. For example, in FIG. 8A, the first ring platform (e.g., the ring platform 100) can be seen housing the segment 40, that includes the memory 58, sensing transducer 56, timer circuit 54, processor 50, energy storage device 62, and the low-power wireless-communications interface 52, all from FIG. 7A. Further, the interface 101, which includes a pressure sensor (e.g., the pressure sensor 102, FIG. 1), is an opening, where the sensing transducer 56 is located within the ring platform 100.

Likewise, FIG. 8B shows a second ring platform 110 housing the segment 70, that includes the memory 58', sensing transducer 56', timer circuit 54', processor 50', energy storage device 62', the low-power wireless-communications interface 52', and the medium-power wireless-communications interface 72', all from FIG. 7B. Further, the interface 101', that includes a pressure sensor (e.g., the pressure sensor 102), is an opening, where the sensing transducer 56' is located within the second ring platform 110.

FIG. 8C shows a third ring platform 112 housing the segment 70, that includes the memory 58", sensing transducer 56", timer circuit 54", processor 50", energy storage 62", the low-power wireless-communications interface 52", the medium-power wireless-communications interface 72", and the high-power wireless-communications interface 82". Further, the interface 101", that includes a pressure sensor (e.g., the pressure sensor 102), is an opening, where the sensing transducer 56" is located within the ring platform 120.

FIG. 9A shows a wireless camera 120 attached to a fire extinguisher 108, located above the body 104 of the fire extinguisher 108. The wireless camera 120 is configured to capture images of a pressure gauge 106 of the fire extinguisher 108 and wirelessly transmit the images of the captured pressure levels to a designated location (e.g., a network service, server, electronic device of an authorized user). In some embodiments, the wireless camera 120 may be embedded within one of the ring platforms 100, 110, and/or 120. Alternatively, in an embodiment, one of the respective ring platforms 100, 110, 112 may wirelessly receive the captured images from the wireless camera 120 and then transmit the captured images of the pressure levels to the designated location.

FIG. 9B shows a diagrammatic view of a segment of flexible adhesive tape agent platform 130 (e.g., the segments 40, 70, and 80, FIGS. 7A-C) with an embedded camera 132 being adhesively affixed to a pressure sensor 134 (e.g., the pressure gauge 106, with reference to FIGS. 2 and 9A). In some embodiments, the embedded camera 132 may include a lens, such as a stochastic lens. In some embodiments, machine learning may be used to analyze any captured images, by comparing the captured images to historical captured images. In some embodiments, the camera 132 may capture a digital image that includes the pressure sensor 134, which may be blurry. For example, a blurry digital image may include pixels that are scrambled in different directions. Analyzing the captured digital image of the pressure sensor may include focusing on portions of pixels within the captured digital image that are necessary in determining a reading of the pressure sensor (e.g., the pixels that include the reading of the pressure sensor gauge) and excluding all other pixels that do not relate to the sensor reading. In some embodiments, to reduce the need for focusing, a thin lens may be used. In some embodiments, the thin lens may be embedded within the segment of flexible adhesive tape agent platform 130, and artificial intelligence may be used to analyze the captured digital images.

FIG. 9C shows a diagrammatic view of a segment of flexible adhesive tape agent platform 136 (e.g., the segments 40, 70, and 80) with an embedded camera 138 being adhesively affixed to a flow meter 140 of, e.g., a sewer or water pipe. The flexible adhesive tape agent platform 136 may include any of the communication-interfaces (e.g., the low, medium, or high-power wireless-communication interfaces 52, 52', 52", 72', 72", and 82") and transmit the captured digital images of the flow meter 140, taken by the embedded camera 138, to the designated location.

Figure 10:
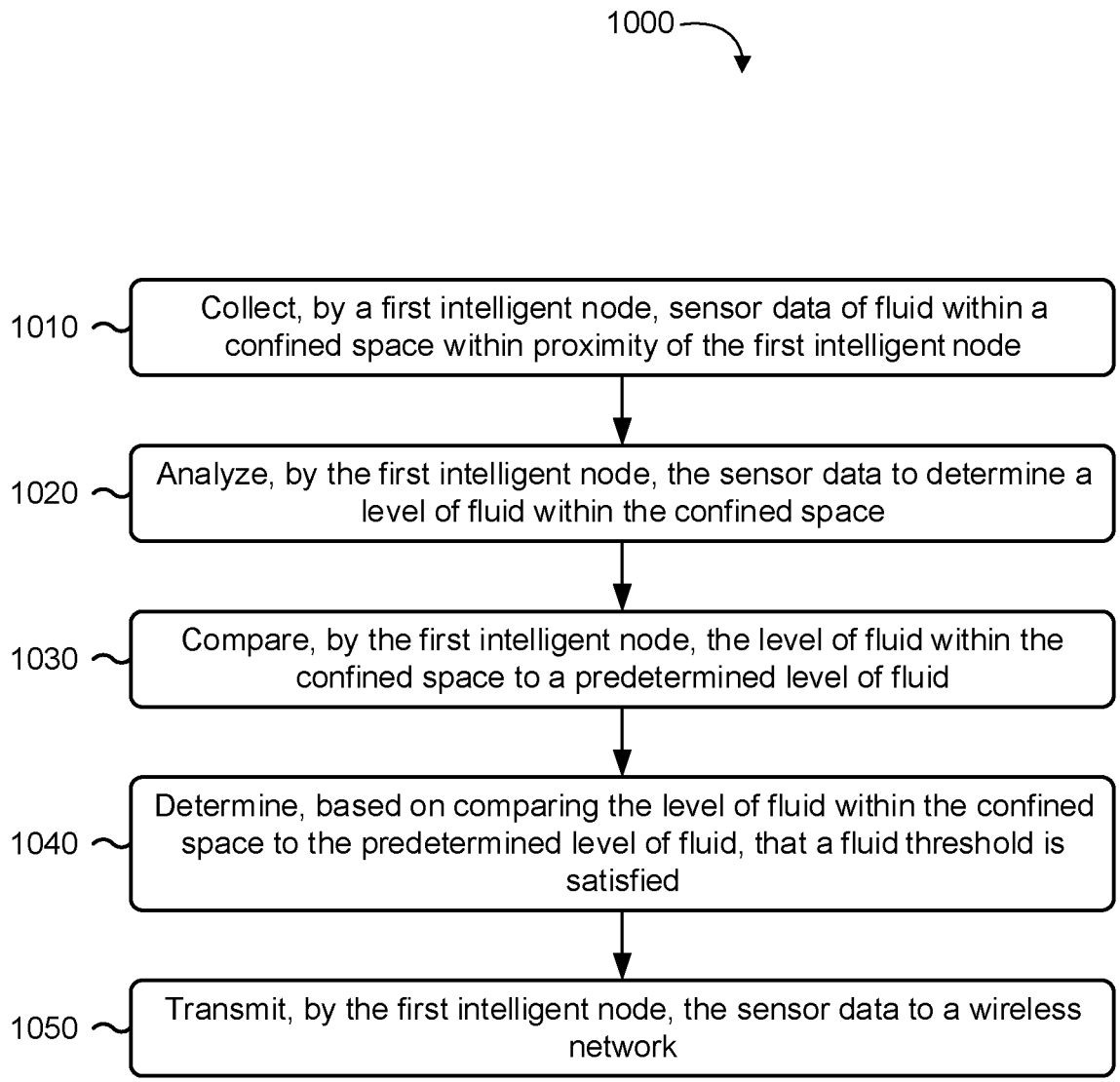
FIG. 10 is a flowchart of a method of monitoring fluid levels and a type of fluid of safety devices and storage containers, among network agents, to determine if fluids should be replaced or refilled, according to embodiments.

FIG. 10 is a flowchart showing one example fluid-level monitoring-process 1000 among network agents to determine if fluids should be replaced or refilled. In some implementations, one or more operations of FIG. 10 may be performed by a first intelligent node (e.g., the master agent, secondary agent, or tertiary agent). In some implementations, one or more operations of FIG. 10 may be performed by another device or a group of devices separate from or including the first intelligent node, an agent, or ring platform. Additionally, or alternatively, one or more operations of FIG. 10 may be performed by one or more components of computer apparatus 320, such as processing unit 322, system memory 324, persistent storage memory 328, input devices 330, display controller 334, and/or communication interface (e.g., the low, medium, and high-power wireless-communication interfaces, FIGS. 7A-C), or any of the other components discussed herein.

As shown in FIG. 10, process 1000 may include collecting (1010) sensor data of fluid within a confined space, that is within proximity of the first intelligent node. In some embodiments, the fluid is at least one of a fire retardant (e.g., within a fire extinguisher), battery fluid (e.g., within a battery of a fire alarm), toxic waste (within a storage container), chemical waste, battery acid, and oil. In some embodiments, the first intelligent node may be a master agent (e.g., segment 40, FIG. 7A), a secondary agent (e.g., segment 70, FIG. 7B), or a tertiary agent (e.g., segment 80, FIG. 7C), as described above with reference to FIG. 4. Furthermore, the first intelligent node may be the first ring platform 100, the second ring platform 110, or the third ring platform 112, with reference to FIG. 8A-C. In some embodiments, the first intelligent node may be the ring platform 100 utilizing a pressure sensor to monitor the pressure of chemical retardant within a fire extinguisher or a camera to monitor a pressure gauge of a fire extinguisher or flow meter of a pipe.

In some embodiments, the first intelligent node may be any of the segments 40, 70, 80, with any of an embedded time-of-flight sensor, an ultrasonic sensor, and/or a camera. Continuing the embodiment, the first intelligent node may be attached to a storage container, as described in FIG. 3 monitoring toxic waste, chemical waste, oil, etc., being deposited into the storage container. In some embodiments, the intelligent node may be adhesively attached to a pipe and monitoring the pressure sensor or a flow meter of the pipe.

As further shown in FIG. 10, process 1000 may include analyzing (1020) the sensor data to determine a level of fluid within the confined space. In some embodiments, the processor within the intelligent node may analyze the sensor data. For example, the intelligent node may be adhesively attached to a storage container, with an embedded camera, as described with reference to FIG. 3; be adhesively attached to a pipe, with an embedded camera, as described with 9B, C; or be a ring platform formed to the boundary of the upper portion of a fire extinguisher, as described with reference to FIG. 9A. Continuing the embodiment, the camera may capture a digital image of the gauge (e.g., the pressure gauge 106 or the flow meter 140). The processor of the intelligent node may analyze (e.g., using machine learning) the digital image to determine a level of fluid within the fire extinguisher, the storage container, or the pipe. In some embodiments, the processor may discern a subset of pixels of the captured digital image, that relate to the gauge, from the pixels of the captured digital images that are not related to the gauge. From this, the processor may analyze the subset of pixels that relate to the gauge to determine the level of fluid within a pipe, safety device, or storage container.

In some embodiments, when the first intelligent node is attached to a storage container, the processor may analyze the sensor data to determine the type of fluid that is within or being deposited into the storage container. For example, the first intelligent node may include an optical sensor that analyzes the chemical composition of the fluid within the storage container.

As further shown in FIG. 10, process 1000 may include comparing (1030) the level of fluid within the confined space to a predetermined level of fluid. In some embodiments, the predetermined level of fluid may be a maximum acceptable amount of fluid within a storage container before the fluid within the storage container must be replaced. In some embodiments, the predetermined level of fluid may be the minimum acceptable amount of chemical retardant within a fire extinguisher before the fire extinguisher needs to be replaced or refilled, according to safety regulations. In some embodiments, as in the embodiment of determining a type of fluid within a toxic storage container, there may not be a predetermined level of fluid but, rather, a predetermined type of fluid(s). And, if a certain type of fluid(s) is mixed with the predetermined types of fluid(s), the storage container may become more hazardous.

As further shown in FIG. 10, process 1000 may include determining (1040), based on comparing the level of fluid within the confined space to the predetermined level of fluid, that a fluid threshold is satisfied. In some embodiments, the difference between the level of fluid and the predetermined level of fluid, or the type of fluid and the predetermined type of fluid, may have satisfied a threshold that indicates an acceptable limit or type of fluid before the fluid must be replaced.

As further shown in FIG. 10, process 1000 may include transmitting (1050) the sensor data to a wireless network. In some embodiments, the first intelligent node may transmit the sensor data using a wireless-communication interface (e.g., either the low-power wireless-communication interface 52, medium-power wireless-communication interface 72', or high-power wireless-communication interface 82", FIGS. 7A-C). In some embodiments, the first intelligent node may transmit the sensor data to an authorized location (e.g., a remote server or to a mobile device of an authorized user).

In some embodiments, the first intelligent node may transmit the sensor data a second intelligent node, that has a wireless-communication interface (e.g., medium-power wireless-communication interface 72' or high-power wireless-communication interface 82") that is capable of transmitting the sensor data to a remote server, outside the reach of the first intelligent node's wireless-communication interface (e.g., low-power wireless-communication interface 52 or medium-power wireless-communication interface 72). For example, the first intelligent node may be attached to a fire hydrant or to a storage container and the second intelligent node may be attached to a vehicle. When the second intelligent node passes the first intelligent node, the first intelligent may communicate with the second intelligent node, learning the second intelligent node has wireless-communications capabilities greater than the first intelligent node. The first intelligent node may then transmit the sensor data to the second intelligent node and instruct the second intelligent node to transmit the sensor data to the remote server.

In some embodiments, there may be a chain of transmission, where the first intelligent node transmits sensor data to a second intelligent node, that transmits the sensor data to a third intelligent node, that transmits the sensor data to an authorized/designated location (e.g., a server). The third intelligent node may have a medium-power wireless-communication interface or a high-power wireless-communications interface.

In some embodiments, the low-power wireless-communications interface may include Zigbee or Bluetooth® Low Energy (BLE) interface; the medium-power wireless-communications interface may include Zigbee or Bluetooth® Low Energy, and LoRa; and the high-power wireless-communications interface may include Zigbee or Bluetooth® Low Energy, LoRa, GSM/GPRS, cellular, NFC, and RFID.

In some embodiments, the sensor data may be collected by a sensor embedded within the first intelligent node and is at least one of a capacitive sensor, a temperature sensor, a pressure sensor, a piezoelectric sensor, an optical sensor, a radioactivity sensor, a chemical sensor, a biosensor, a magnetic sensor, an electromagnetic field sensor, and a humidity sensor, time-of-flight sensor, and ultrasonic sensor.

Figure 11:
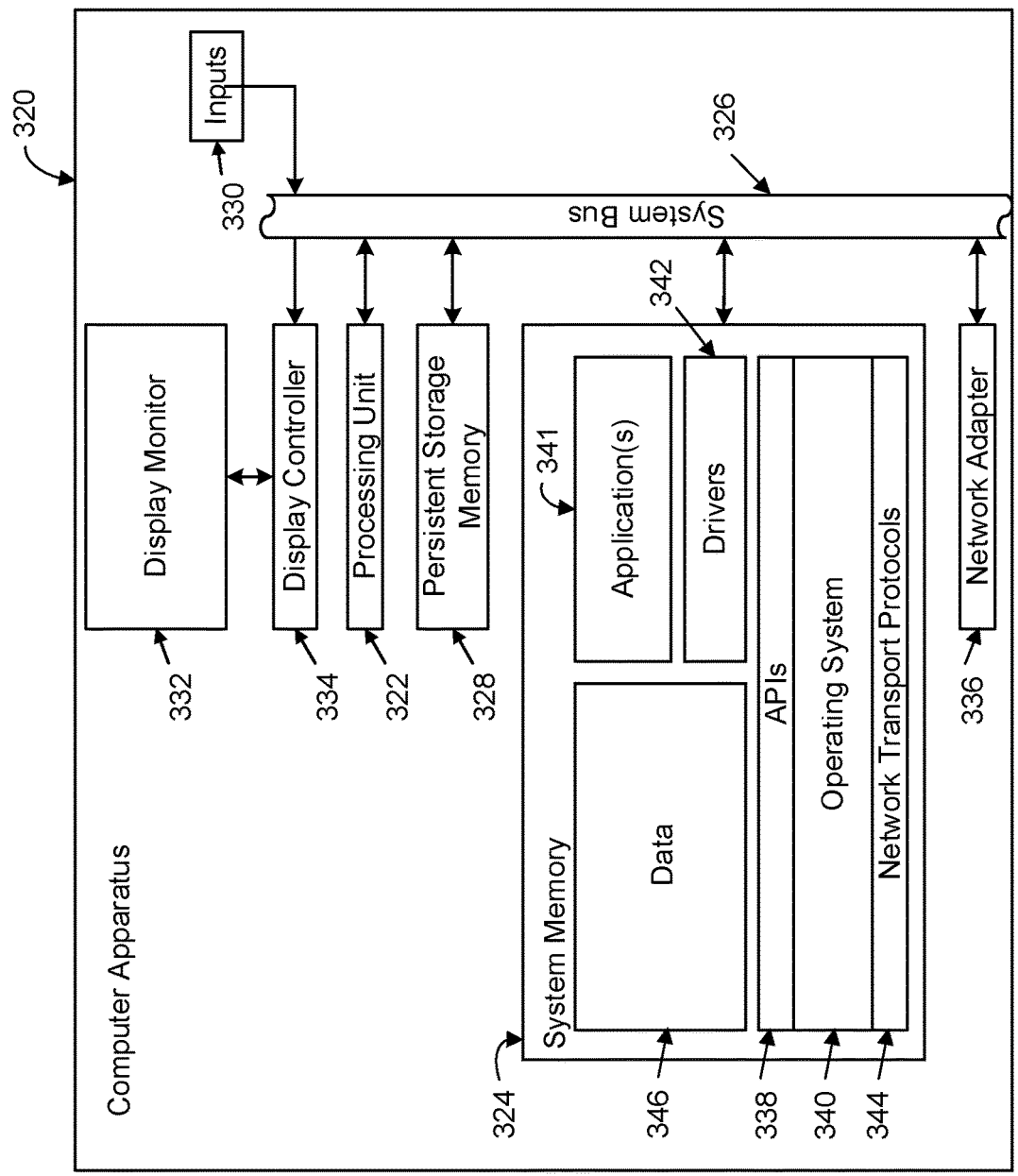
FIG. 11 is a block diagram of an example computer apparatus, according to an embodiment.

FIG. 11 shows an example embodiment of computer apparatus 320 that, either alone or in combination with one or more other computing apparatus, is operable to implement one or more of the computer systems described in this specification. The computer apparatus 320 includes a processing unit 322, a system memory 324, and a system bus 326 that couples the processing unit 322 to the various components of the computer apparatus 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer apparatus 320, and a random-access memory (RAM). The system bus 326 may be a memory bus, a peripheral bus, or a local bus, and may be compatible with any of a variety of bus protocols, including PCI, VESA, Microchannel, ISA, and EISA. The computer apparatus 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer apparatus 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer apparatus 320 also may include other input/output hardware (e.g., peripheral output devices, such as speakers and a printer). The computer apparatus 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer apparatus 320 to perform one or more of the steps, tasks, operations, or processes of the positioning and/or tracking systems described herein, drivers 342 (e.g., a GUI driver), network transport protocols 344, and data 346 (e.g., input data, output data, program data, a registry, and configuration settings).

In some embodiments, the data 346 may be in the form of a table that lists each of the safety devices and containers (e.g., fire extinguisher 108, storage container 170, pressure sensor 134, flow meter 140, etc.) being monitored using the ring platform 100, sensors 171, 172, camera 176, and tape agent 174. The table may further include a record for each of the safety devices and containers and any data being transmitted/received from the ring platform 100, sensors 171, 172, camera 176, and tape agent 174 or to/from a server. Further, the data may include records of any alerts generated from any of the ring platform 100, sensors 171, 172, camera 176, and tape agent 174, as described with reference to FIGS. 2 and 3. The data may further include a record when maintenance (e.g., when a safety device or container was refilled, emptied, inspected, checked, etc.) was performed.

The data may further include dates corresponding for each of the safety devices and containers and for each of the ring platform 100, sensors 171, 172, camera 176, and tape agent 174. For example, the dates may refer to the date of initiation or activation (date of deployment) for each of the safety devices and safety containers and for each of the ring platform 100, sensors 171, 172, camera 176, and tape agent 174. The dates may further include the dates of maintenance, expected lifetime, etc. for each safety device and container and the ring platform 100, sensors 171, 172, camera 176, and tape agent 174.

In some embodiments, the data may be accessed and referenced when an event (e.g., maintenance) or alert (with reference to FIGS. 2 and 3) is received (e.g., by a client device or server) from any of the ring platform 100, sensors 171, 172, camera 176, and tape agent 174. For example, if the ring platform 100 is attached to a fire extinguisher (e.g., fire extinguisher 108) and detects low pressure of the chemical retardant within the fire extinguisher, the dates of maintenance for the fire extinguisher may be checked to determine if maintenance is close in time or for indicia of an issue related to the fire extinguisher. The dates may be used, in part, to determine when/if/how an alert may be generated, to the nearby public, within the display, speaker, etc. within or associated with one of the ring platform 100, sensors 171, 172, camera 176, and tape agent 174, as discussed in FIGS. 2 and 3. Further, the dates may be used, in part, to determine when/if/how an alert may be generated and then transmitted to a client device or server.

Examples of the subject matter described herein, including the disclosed systems, methods, processes, functional operations, and logic flows, may be implemented in data processing apparatus (e.g., computer hardware and digital electronic circuitry) operable to perform functions by operating on input and generating output. Examples of the subject matter described herein also may be tangibly embodied in software or firmware, as one or more sets of computer instructions encoded on one or more tangible non-transitory carrier media (e.g., a machine-readable storage device, substrate, or sequential access memory device) for execution by data processing apparatus.

The details of specific implementations described herein may be specific to particular embodiments of particular disclosures and should not be construed as limitations on the scope of any claimed disclosure. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

The invention claimed is:

1. A method, comprising:
   collecting, by a first intelligent node, sensor data of fluid within a confined space within proximity of the first intelligent node, the sensor data comprising a captured digital image of a pressure meter of the confined space; wherein the captured digital image is collected by a camera embedded within the first intelligent node;
   analyzing, by the first intelligent node, the sensor data, wherein the analyzing comprises discerning a subset of pixels of the captured digital image that includes elements of the pressure meter from other pixels of the captured digital image that do not include elements of the pressure meter;
   determining, by the first intelligent node, a level of fluid within the confined space based on analyzing the subset of pixels of the digital image that include elements of the pressure meter;
   comparing, by the first intelligent node, the level of fluid within the confined space to a predetermined level of fluid;
   determining, based on comparing the level of fluid within the confined space to the predetermined level of fluid, that a fluid threshold is satisfied;
   transmitting, by the first intelligent node, the sensor data to a wireless network in response to determining that the fluid threshold is satisfied; and
   after the transmitting, verifying, by the first intelligent node, proper performance of maintenance on the confined space by collecting and analyzing additional sensor data using the intelligent node.

2. The method of claim 1, wherein the wireless network includes at least the first intelligent node and a second intelligent node and wherein transmitting the sensor data to the network includes transmitting the sensor data, from the first intelligent node, to the second intelligent node, the method further comprising:
   transmitting, by the second intelligent node, the sensor data to a remote server.

3. The method of claim 2, wherein the first intelligent node includes a low- power wireless-communications interface and the second intelligent node includes a medium-power wireless-communication interface that has a longer wireless-communication range than the low-power wireless-communication interface.

4. The method of claim 3, wherein the low-power wireless-communications interface implements protocols including Zigbee, near-field communication (NFC), Bluetooth Low Energy, Bluetooth Classic, Wi-Fi, and ultra-wideband.

5. The method of claim 1, wherein the wireless network includes at least the first intelligent node, a second intelligent node, and a third intelligent node, and wherein transmitting the sensor data to the network includes transmitting the sensor data, from the first intelligent node, to the second intelligent node, the method further comprising:
   transmitting, by the second intelligent node, the sensor data to the third intelligent node; and
   transmitting, by the third intelligent node, the sensor data to a remote server.

6. The method of claim 5, wherein the first intelligent node includes a low- power wireless-communications interface, the second intelligent node includes a medium-power wireless-communication interface, and the third intelligent node includes a high-power wireless- communication interface.

7. The method of claim 6, wherein the medium-power wireless-communications interface implements one or more protocols including Zigbee, Bluetooth Low Energy, and LoRa, and may communicate with the low-power wireless-communication interface at least over Zigbee or Bluetooth Low Energy, and may communicate with a high-power wireless- communications interface at least over LoRa.

8. The method of claim 6, wherein the high-power wireless-communications interface implements protocols including Zigbee, Bluetooth Low Energy, LoRa, Global System for Mobile Communication, General Packet Radio Service, cellular, near-field communication, and radio-frequency identification, and the high-power wireless-communications interface communicates with the low-power wireless-communications interface using Zigbee or Bluetooth Low Energy, and communicates with the medium-power wireless-communications interface using LoRa.

9. The method of claim 1, wherein the sensor data is collected by a sensor that is at least one of a capacitive sensor, a temperature sensor, a pressure sensor, a piezoelectric sensor, an optical sensor, a radioactivity sensor, a chemical sensor, a biosensor, a magnetic sensor, an electromagnetic field sensor, and a humidity sensor, time-of-flight sensor, and ultrasonic sensor.

10. The method of claim 1, wherein the first intelligent node includes an adhesive layer for attaching the first intelligent node to a boundary of the confined space.

11. The method of claim 10, wherein the confined space is at least one of a safety device and a toxic storage container.

12. The method of claim 11, wherein the fluid is at least one of a fire retardant, battery fluid, toxic waste, chemical waste, battery acid, and oil.

13. The method of claim 1, wherein the first intelligent node is housed within a ring platform surrounding a portion of a fire extinguisher, and the fluid is a fire retardant.

14. A network of intelligent nodes comprising a first intelligent node having a first processor, a first memory communicatively coupled with the first processor, the first memory storing machine readable instructions that, when executed by the first processor, cause the first processor to:
   collect sensor data of fluid within a confined space within proximity of the first intelligent node, the sensor data comprising a captured digital image of a pressure meter of the confined space, wherein the captured digital image is collected by a camera embedded within the first intelligent node;
   analyze the sensor data, wherein the analyzing comprises discerning a subset of pixels of the captured digital image that include elements of the pressure meter from pixels of the captured digital image that do not include elements of the pressure meter;
   determine a level of fluid within the confined space based on analyzing the subset of pixels of the digital image that include elements of the pressure meter;
   compare the level of fluid within the confined space to a predetermined level of fluid;
   determine, based on comparing the level of fluid within the confined space to the predetermined level of fluid, that a fluid threshold is satisfied; and
   transmit the sensor data to a wireless network in response to determining that the fluid threshold is satisfied;
   receive confirmation of maintenance performed on the confined space based on the sensor data.

15. The network of intelligent nodes of claim 14, wherein the first intelligent node utilizes machine learning to analyze the subset of pixels of the digital image that include elements of the pressure meter.

16. The network of intelligent nodes of claim 14, wherein the network of intelligent nodes further includes a second intelligent node and wherein transmitting the sensor data to the wireless network network includes transmitting the sensor data, from the first intelligent node, to the second intelligent node, the second intelligent node has a second processor, a second memory communicatively coupled with the second processor, the second memory storing machine readable instructions that, when executed by the second processor, cause the second processor to:
   transmit, by the second intelligent node, the sensor data to a remote server.

17. The network of intelligent nodes of claim 14, wherein the first intelligent node includes an adhesive layer for attaching the first intelligent node to a boundary of the confined space, and wherein the confined space is at least one of a safety device and a toxic storage container.

18. The network of intelligent nodes of claim 17, wherein the fluid is at least one of a fire retardant, battery fluid, toxic waste, chemical waste, battery acid, and oil.

19. The network of intelligent nodes of claim 14, wherein the first intelligent node is housed within a ring platform surrounding a portion of a fire extinguisher that includes a pressure gauge, wherein the sensor data is of a chemical retardant within the fire extinguisher and collected by a camera embedded within the first intelligent node.

20. The network of intelligent nodes of claim 14, wherein the first intelligent node is adhesively attached to a toxic storage container and the sensor data relates to toxic waste, the toxic waste stored in the toxic storage container.

21. The network of intelligent nodes of claim 17, wherein the sensor is collected by at least one of a time-of-flight sensor, an ultrasonic sensor, and an optical sensor.

22. A non-transitory computer readable medium storing instructions that when executed by a processor, cause the processor to:
   collect sensor data of fluid within a confined space within proximity of the intelligent node; the sensor data comprising a captured digital image of a pressure meter of the confined space; wherein the captured digital image is collected by a camera embedded within the first intelligent node;
   analyze the sensor data, wherein the analyzing comprises discerning a subset of pixels of the captured digital image that include elements of the pressure meter from pixels of the captured digital image that do not include elements of the pressure meter;
   determine a level of fluid within the confined space based on analyzing the subset of pixels of the digital image that include elements of the pressure meter;
   compare the level of fluid within the confined space to a predetermined level of fluid;
   determine, based on comparing the level of fluid within the confined space to the predetermined level of fluid, that a fluid threshold is satisfied; and
   transmit the sensor data to a wireless network in response to determining that the fluid threshold is satisfied;
   after the transmitting, verifying proper performance of maintenance on the confined space by collecting and analyzing additional sensor data using the intelligent node.

23. The method of claim 22, further comprising, between the transmitting and the verifying, receiving, by the intelligent node, confirmation of maintenance performed on the confined space based on the sensor data.

* * * * *